(12) United States Patent
Sondermann et al.

(10) Patent No.: US 10,877,286 B2
(45) Date of Patent: Dec. 29, 2020

(54) MULTI-WAY PRISM

(71) Applicants: Carl Zeiss Jena GmbH, Jena (DE); Carl Zeiss AG, Jena (DE)

(72) Inventors: Mario Sondermann, Quohren (DE); Torsten Antrack, Jena (DE); Gunther Lorenz, Jena (DE)

(73) Assignees: Cad Zeiss Jena GmbH, Jena (DE); Carl Zeiss AG, Jena (DE)

( * ) Notice: Subject to any disclaimer, the term of this patent is extended or adjusted under 35 U.S.C. 154(b) by 73 days.

(21) Appl. No.: 16/091,686

(22) PCT Filed: Feb. 2, 2017

(86) PCT No.: PCT/EP2017/052269
§ 371 (c)(1),
(2) Date: Oct. 5, 2018

(87) PCT Pub. No.: WO2017/174225
PCT Pub. Date: Oct. 12, 2017

(65) Prior Publication Data
US 2019/0162976 A1   May 30, 2019

(30) Foreign Application Priority Data

Apr. 8, 2016   (DE) .................. 10 2016 106 462

(51) Int. Cl.
*G02B 27/10*   (2006.01)
*G02B 27/12*   (2006.01)
(Continued)

(52) U.S. Cl.
CPC ........... *G02B 27/106* (2013.01); *G02B 5/045* (2013.01); *G02B 27/102* (2013.01);
(Continued)

(58) Field of Classification Search
CPC .... G02B 5/045; G02B 27/106; G02B 27/102; G02B 27/1026; G02B 27/16; G03B 3/06; G03B 21/142
(Continued)

(56) References Cited

U.S. PATENT DOCUMENTS

| | | | |
|---|---|---|---|
| 4,164,752 A | 8/1979 | Doi et al. | |
| 5,602,679 A * | 2/1997 | Dolgoff | G02F 1/133382 |
| | | | 359/640 |

(Continued)

FOREIGN PATENT DOCUMENTS

| | | |
|---|---|---|
| EP | 1821092 | 8/2007 |
| GB | 2163865 | 3/1986 |
| JP | S63132590 | 6/1988 |

OTHER PUBLICATIONS

International Search Report with English Language Translation corresponding to International Patent Application No. PCT/EP2017/052269, dated May 9, 2017. (5 pages).
(Continued)

*Primary Examiner* — William R Alexander
(74) *Attorney, Agent, or Firm* — Myers Bigel, P.A.

(57) ABSTRACT

An optical arrangement includes a stack structure comprising at least three prisms. The optical arrangement includes a main optical path and for each of the prisms, a secondary optical path. The optical arrangement also includes at least one interface. Each of the at least one interface is arranged between a corresponding first stack section of the stack structure and a corresponding second stack section of the stack structure. Each of the at least one interface is configured to enable relative movement of the corresponding first stack section and of the corresponding second stack section with respect to one another.

22 Claims, 12 Drawing Sheets

(51) Int. Cl.
*G02B 27/16* (2006.01)
*G03B 21/14* (2006.01)
*G03B 3/06* (2006.01)
*G02B 5/04* (2006.01)
*G03B 21/28* (2006.01)
*G03B 21/20* (2006.01)
*G03B 17/17* (2006.01)

(52) U.S. Cl.
CPC ....... *G02B 27/1026* (2013.01); *G02B 27/126* (2013.01); *G02B 27/16* (2013.01); *G03B 3/06* (2013.01); *G03B 21/142* (2013.01); *G03B 17/17* (2013.01); *G03B 21/2066* (2013.01); *G03B 21/28* (2013.01); *G03B 2205/003* (2013.01)

(58) Field of Classification Search
USPC ........................................................ 359/640
See application file for complete search history.

(56) References Cited

U.S. PATENT DOCUMENTS

| | | | |
|---|---|---|---|
| 5,777,674 A | | 7/1998 | Ohmuro |
| 6,038,076 A | * | 3/2000 | Bouzid .............. G01J 3/14 359/634 |
| 6,181,414 B1 | * | 1/2001 | Raz .............. G01N 15/1475 250/339.05 |
| 6,330,113 B1 | | 12/2001 | Slagle et al. |
| 9,207,045 B2 | * | 12/2015 | Eckhardt ............ G02B 26/0883 |
| 2003/0098955 A1 | | 5/2003 | Okuyama et al. |
| 2005/0099607 A1 | * | 5/2005 | Yokote ................ H04N 9/3194 353/43 |
| 2005/0248661 A1 | * | 11/2005 | Stanvely ............ H04N 5/23287 348/208.99 |
| 2007/0019299 A1 | | 1/2007 | Sawai et al. |
| 2011/0019157 A1 | | 1/2011 | He |
| 2012/0312968 A1 | * | 12/2012 | Eckhardt ............ G02B 26/0883 250/216 |

OTHER PUBLICATIONS

ARIB Technical Report BTA S-1005B "Interconnection for HDTV Studio Equipment" Association of Radio Industries and Businesses (1997).

* cited by examiner

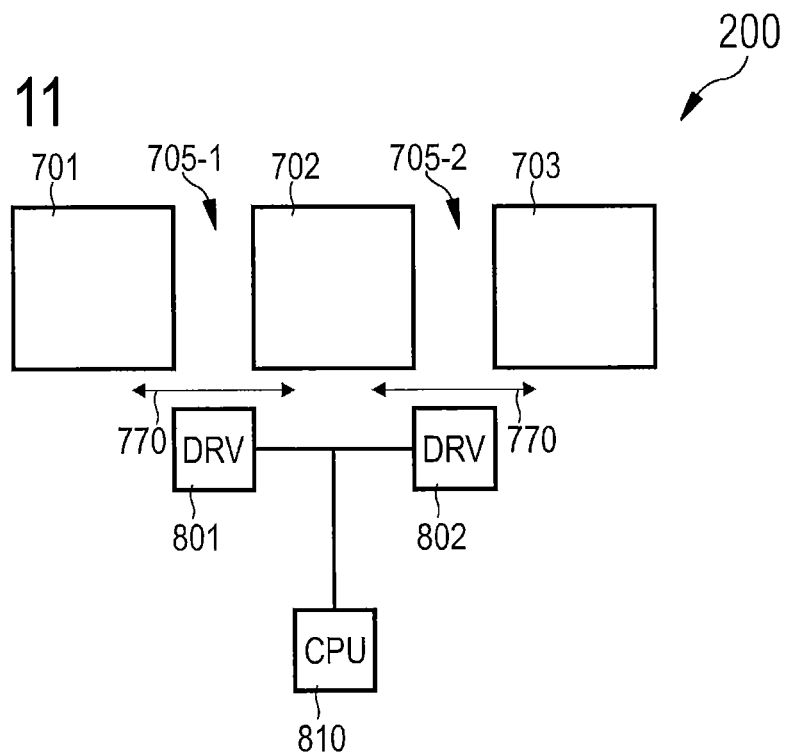
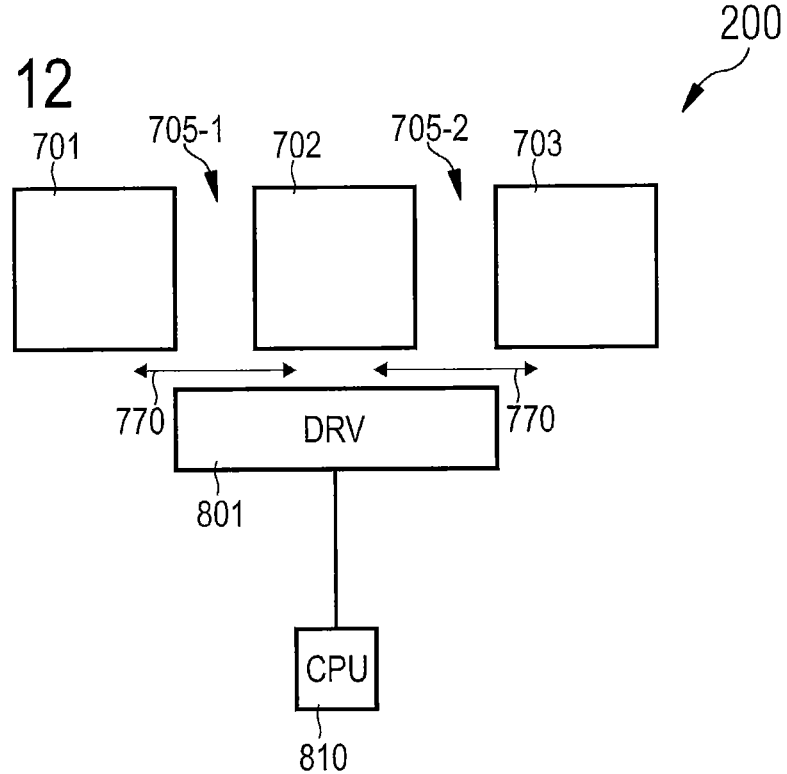

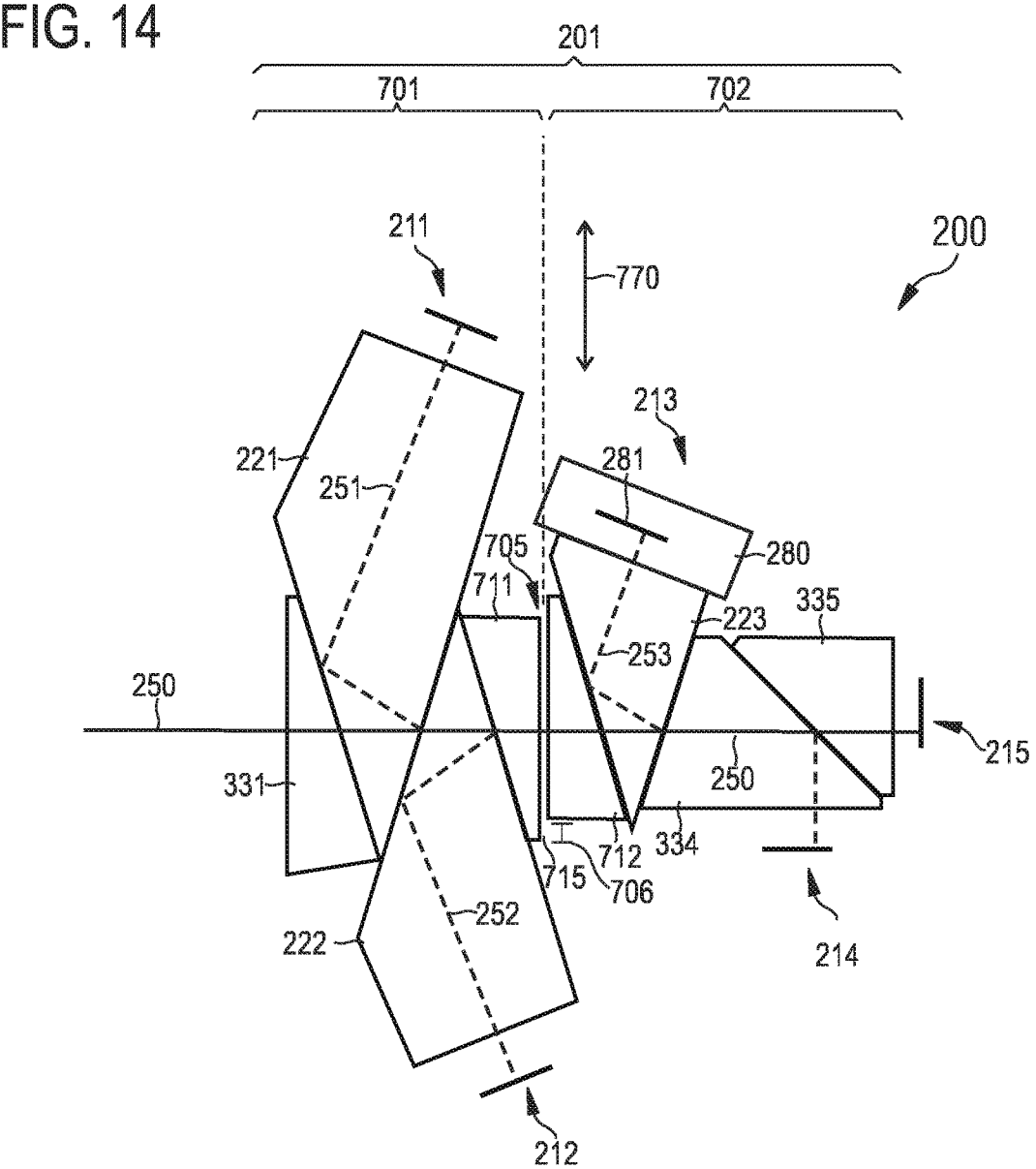

MULTI-WAY PRISM

CROSS REFERENCE TO RELATED APPLICATIONS

This application is a 35 U.S.C. § 371 national stage application of PCT International Application No. PCT/EP2017/052269, filed on Feb. 2, 2017, which claims priority from German Patent Application No. DE 102016106462.9, filed on Apr. 8, 2016, the contents of which are incorporated herein by reference in their entireties. The above-referenced PCT International Application was published in the German language as International Publication No. WO 2017/174225 A1 on Oct. 12, 2017.

TECHNICAL FIELD

Various embodiments of the invention relate to an optical arrangement comprising a stack structure having at least three prisms. Further embodiments of the invention relate to a corresponding lens connection for a camera.

BACKGROUND

Optical arrangements having a plurality of prisms (multi-way prisms) are used to split light into a plurality of channels or to combine light. In this case, the splitting or combining of the light may occur for example with regard to the spectral range of the light.

FIG. 1 illustrates an optical arrangement 100 that is known from the prior art. This optical arrangement 100 implements a multi-way prism. The multi-way prism 100 comprises four prisms 121, 122, 123, 124 in a stack structure, which respectively split light 110 into a corresponding channel 111, 112, 113, 114. A wedge 131 is arranged between the prisms 122 and 123 and within the stack structure. Therefore, the channels 111, 112 are rotated relative to the channels 113, 114. An optical plate 132 is also provided, which defines a further channel 115.

The multi-way prism 100 may cause splitting of incident light 110 (illustrated in FIG. 1). In such a scenario, the different channels 111-115 may each have a detector configured to detect an image. It may be necessary to carry out focusing in relation to an image plane of an upstream lens (not illustrated in FIG. 1) onto a sensor surface of the respective detector. In this case, the distance between the detector and an outer surface of the respective prism 121-124 is varied (identified by the arrows in FIG. 1). However, it is also possible to operate the multi-way prism 100 for combining light. It is accordingly known to assign a respective light source to the different channels 111-115. It may then be worthwhile to carry out focusing of the light sources onto an image plane outside the multi-way prism; this may in turn be done by varying the distance between the light source and the exit or entrance surface of the respective prism 121-124.

In such cases, the light path is respectively altered in order to achieve the focusing. However, such a movement for varying the distance between the detector/light source and the outer surface of the respective prism 121-124 may require comparatively complex structural measures. Moreover, it may be possible that such a movement of the detector/light source requires a motor, for example, which occupies significant structural space.

SUMMARY

Therefore, there is a need for improved optical arrangements which comprise a plurality of prisms for splitting or combining light. In particular, there is a need for optical arrangements which eliminate at least some of the restrictions or disadvantages mentioned above.

This object is achieved by the features of the independent patent claims. The features of the dependent patent claims define embodiments.

In accordance with one embodiment, an optical arrangement comprises a stack structure. The stack structure comprises at least three prisms. Each of the at least three prisms has a first surface and an opposite second surface. The optical arrangement also comprises a main optical path, which extends through the stack structure. The optical arrangement also comprises, in each case for each of the prisms of the stack structure: a secondary optical path, which extends through the corresponding prism and which is connected to the main path by partial reflection of light at the second surface of the corresponding prism. The optical arrangement also comprises at least one interface. Each of the at least one interface is arranged between a corresponding first stack section of the stack structure and a corresponding second stack section of the stack structure. Each of the at least one interface is configured to enable relative movement of the corresponding first stack section and of the corresponding second stack section with respect to one another.

Such an optical arrangement may thus implement a multi-way prism since a plurality of secondary paths are defined for light. In particular, such an optical arrangement may implement a multi-way prism in which the different prisms of the stack structure are arranged movably relative to one another. Such a relative movement makes it possible for example to carry out an adaptation of at least one of the secondary optical paths with regard to desired optical properties; by way of example, focusing and/or image stabilization may become possible for diverse optical applications of the multi-way prism. In particular, such techniques may make it possible to alter the light path within the optical arrangement: by way of example, the light path may be shortened or lengthened. It may also be possible to alter the position of the secondary optical paths in relation to the respective prism.

Possible optical applications for such a multi-way prism comprise e.g.: beam splitting for incident light into different channels, wherein different channels have a detector and/or an eyepiece; and beam combining for emergent light from different channels, wherein different channels have a light source, for example a halogen light source, a light emitting diode, a laser, etc.

The stack structure may be obtained for example by stacking the different prisms one on top of another. Adjacent prisms, at least within a stack section, may adjoin one another, i.e. be arranged alongside one another without further, interposed optical components composed of glass. By way of example, an air gap and/or a filter may be arranged between adjacent prisms of the stack structure. In this way, air within the air gap and glass of the different prisms may define different optical media, i.e. media having different refractive indices. Further optical components composed of glass which influence the light path through the stack structure may not be provided between adjacent prisms, at least within a stack section. This means that it is possible for the transitions between different optical media, at least within a stack section, along the main optical path within the stack structure, to be formed only by the surfaces of the prisms of the stack structure. Other structures that would cause transitions between different optical media may not be present. Using such a stack structure makes it possible to achieve a particularly small structural space for the optical arrangement. Moreover, the optical arrangement may be constructed comparatively simply and with little complexity.

By way of example, it is possible for the different stack sections of the stack structure each to comprise a single prism or else more than a single prism. For example, the different stack sections of the stack structure may each comprise two or three or more prisms. For example, it would be possible for the first stack section and/or the second stack section of at least one of the at least one interface to comprise at least two prisms that are rigidly coupled to one another. Within the different stack sections of the stack structure, it is thus possible for adjacent and mutually adjoining prisms to be rigidly coupled to one another. A rigid coupling may be achieved if a relative movement between the rigidly coupled prisms is not possible or is possible only to a limited extent. For example, it would be possible for adjacent and mutually adjoining prisms within a stack section to be adhesively bonded or screwed to one another or to be fixedly connected to one another in some other way at least at outer surfaces. At the same time it may be worthwhile for an air gap to be present between adjacent and mutually adjoining prisms within a stack section, in order for example to foster total internal reflection at the respective first surface of a prism. In the case of such a rigid coupling of mutually adjoining prisms of a stack section, it is possible to refer to the respective stack section as continuous. Provided that one or more stack sections comprise more than a single prism, e.g. the light paths for a plurality of secondary optical paths which are assigned to one and the same stack section may be adapted in a correlated manner. Byway of example, combined focusing and/or image stabilization may become possible as a result. This may enable a particularly space-saving implementation and/or an implementation with low complexity.

In one example, it is possible for at least two prisms of a stack section that are rigidly coupled to one another to have secondary optical paths in the region of an outer surface of the respective prism which form with one another an angle that is greater than 90°, preferably is >120°, particularly preferably is >150°. This may therefore mean that rigidly coupled prisms of a stack section have opposite outer surfaces facing away from one another. This may make it possible for a distance between corresponding detectors and/or light sources assigned to the channel defined by the respective secondary path to be dimensioned as particularly large.

In principle, however, it is not necessary for all or else only some stack sections of the stack structure to comprise more than one prism. In one example, it is possible for the first stack section and/or the second stack section of at least one of the at least one interface to comprise not more than one prism. For example, it would be possible for the number of prisms of the stack structure to correspond to the number of interfaces, i.e. for each stack section to comprise only a single prism. In such an example, a particularly flexible adaptation of the different secondary optical paths may be possible; in particular, different secondary optical paths may be individually adapted. By way of example, individual, channel-specific focusing and/or image stabilization is possible as a result.

The at least one interface may then be configured to enable the relative movement. To that end, the at least one interface may comprise various elements. By way of example, the at least one interface may comprise an air gap arranged between the adjacent prisms of the adjoining first and second stack sections. Depending on positioning or depending on the relative movement, the air gap may have a varying size. Alternatively or additionally it would also be possible for the at least one interface to comprise guide means that limit the degrees of freedom of the relative movement. The guide means could be formed for example by one or more guide rails, guide pins, etc. In particular, it would be possible for the guide means to be arranged outside a region accessible to the beam path of light; by way of example, the guide means may be arranged in an edge region of the outer prisms of the adjoining first and second stack sections. The guide means may also comprise one or more stops that limit the travel of the respective stack sections with respect to one another.

Alternatively or additionally it would also be possible for the at least one interface to comprise one or more optical elements. For example, the at least one interface could comprise one or more wedges, such that partial reflection of light that passes through the interface is reduced or avoided. By way of example, it would be possible for each of the at least one interface to comprise a first wedge having a first surface and a second surface, and also a second wedge having a first surface and a second surface. It would then be possible for the first surface of the first wedge of the interface to be parallel to the second surface of an adjacent prism of the corresponding first stack section. The second surface of the first wedge of the interface may be parallel to the first surface of the second wedge of the interface. The second surface of the second wedge of the interface may be parallel to the first surface of an adjacent prism of the corresponding second stack section. The air gap may be arranged between the second surface of the first wedge of the interface and the first surface of the second wedge of the interface. By virtue of such an arrangement, the partial reflection of light at the interface may be reduced particularly well.

The relative movement may be dimensioned suitably, for example, in order to enable focusing, for example of an image plane of a lens onto a sensor surface of a corresponding detector of the optical arrangement, by adaptation of the light path. Accordingly, it would be possible for the relative movement to be dimensioned suitably in order to enable image stabilization, for example of the image plane of the lens on the sensor surface of the corresponding detector of the optical arrangement. Typically, travels of the relative movement that are in the range of a plurality of 10 μm or a plurality of 100 μm may be worthwhile for corresponding applications. For example, it would be possible for the at least one interface to be configured to enable the relative movement with travel of not less than 500 μm, preferably of not less than 250 μm, particularly preferably of not less than 100 μm. The travel may correspond to a maximum stroke of the relative movement, i.e. a distance between two external positionings of the adjoining stack sections with respect to one another. The travel may correspond to the maximum adaptation of the light path.

In order to enable the relative movement, the optical arrangement may comprise one or more motors. The at least one motor may thus serve as guide means for the relative movement. Examples of motors comprise piezoelectric motors; traveling wave ring motors, etc. By way of example, the optical device could comprise an assigned motor for each of the at least one interface. It would also be possible for the optical device to comprise an assigned motor for each stack section. It would also be possible for a motor to be used for more than one interface. By way of example, the optical arrangement could comprise a single motor, which implements the relative movements for all interfaces present. This may enable a particularly space-saving implementation.

The relative movement may be implemented along different degrees of freedom. By way of example the at least one interface could be configured to enable the relative movement perpendicular and/or parallel to the main path. This means that the at least one interface may be configured to enable an axial and/or lateral relative movement. By way of example, the optical arrangement could comprise an aperture stop arranged in the main optical path. By way of example the aperture stop could be arranged adjacent to an outer prism of the stack structure. It would be possible, for example, for the at least one interface to be configured to enable the relative movement perpendicular to the stop plane of the aperture stop. For example, the movement parallel to the main path or perpendicular to the stop plane of the aperture stop may be particularly worthwhile for an application in the area of focusing. For example, the movement perpendicular to the main path or parallel to the stop plane of the aperture stop may be particularly worthwhile for an application in the area of movement stabilization.

In accordance with the degrees of freedom allowed by the at least one interface, it is possible for the at least one motor to be configured to cause the relative movement parallel to the main path and/or perpendicular to the main path.

By way of example, the optical arrangement may comprise a computing unit, which is connected to the at least one motor and which is configured to control the at least one motor. In this case, the control may be implemented for example depending on a received control signal. Different control signals may be taken into account depending on the application sought.

For example, the motor may be controlled by the computing unit for focusing an image plane defined by the beam path of light along the main path and the secondary paths onto sensor surfaces of detectors of the optical arrangement. It would then be possible, for example, for the control signal to indicate a distance between a lens, which achieves the imaging onto the image plane, and an object to be imaged. Alternatively or additionally it would also be possible for the control signal to indicate an edge contrast in a reference image, such that it is possible to carry out an optimization with regard to the edge contrast for focusing. Alternatively or additionally it would also be possible for the control signal to indicate a type of the lens used. Alternatively or additionally it would also be possible for the control signal to indicate a focal length of the lens.

In a further implementation, the control signal may be indicative of an acceleration of the optical arrangement. In such a case, it is possible to control the motor for image stabilization of the image plane defined by the beam path of light along the main path and the secondary paths on the sensor surface of the detector of the optical device.

For applications in connection with focusing and/or image stabilization, movement time durations for carrying out the relative movement between a start position and an end position of the order of magnitude of milliseconds may be worthwhile; the motor may be configured for a movement of corresponding rapidity.

A first prism of the stack structure may form the outer prism. By way of example, the outer prism may delimit the stack structure. A further outer prism may be arranged on the other side of the stack structure. Further prisms may be arranged between the outer prism and the further outer prism.

A prism may define for example a geometric body which has a polygon as base surface and the side edges of which are for example parallel and of equal length. For example, the prism may define a geometric body which has a triangle as base surface. The first surface and the second surface may be arranged for example such that they are not parallel to one another, i.e. form a prism angle with one another. The prism may have for example a glass body that defines the first surface and the second surface. The glass body may also define further surfaces, for example an outer surface. By way of example, the outer surface may be arranged perpendicular to the respective secondary optical path, such that no or no significant deflection of the light along the secondary path occurs at the outer surface.

For example, it would be possible for the secondary optical path of each prism to experience total internal reflection at the first surface of the respective prism. For example, the prisms of the stack structure may be Bauernfeind prisms. A specific geometric configuration may be achieved in this way. The Bauernfeind prism may achieve a deflection of the secondary optical path from the main optical path in the range of 45° to 60°. The Bauernfeind prism selects light by means of a partial reflection and a total internal reflection. What may be achieved by suitable choice of the prism angles is that partial reflection and/or total internal reflection occurs within the prism. The partial reflection and/or total internal reflection may furthermore be made possible by the air gaps between adjoining surfaces of adjacent prisms and/or filters. In various examples it is possible for the prisms of the stack structure to have at least partly different prism angles. However, it is also possible for the prism angle to be identical for all prisms of the stack structure. By way of example, it would be possible for the optical arrangement furthermore to comprise a wedge. The wedge may have a first surface and a second surface. The wedge may be arranged in the main path adjacent to the first surface of an outer prism of the stack structure. The second surface of the wedge may be arranged parallel to the first surface of the outer prism. Such a wedge may make it possible for the prism angles to be identical for all prisms of the stack structure. In such a case, a particularly small design of the optical arrangement may be ensured since the different prisms may be stacked in a space-efficient manner.

The main optical path may denote for example that path of the light through the stack structure or the optical arrangement which corresponds to a central ray of light incident in parallel fashion. The main optical path may denote for example the path of light through the stack structure which experiences no reflection at the different first and second surfaces of the prisms. Accordingly, the secondary optical paths may denote in each case the paths chosen by light which experiences partial reflection at the respective second surfaces of the prisms of the stack structure.

In one example, the prisms of the stack structure are all shaped identically. This may mean that the first and second surfaces of the prisms have identical dimensions and the different prisms also have identical prism angles. In this way, it may be possible to ensure a particularly efficient production of the optical arrangement. In particular, it is possible to use the same production processes for all the prisms of the stack structure.

An identical shape of the different prisms of the stack structure may in turn be fostered by the presence of the wedge adjacent to the outer prism. For example, it is possible for a wedge angle of the wedge to be in the range of 40% to 60% of the prism angle of the prisms of the stack structure. This means that it is possible for the wedge angle of the wedge to be of approximately half the magnitude of the prism angle of the prisms of the stack structure. With such a wedge angle it may be possible, in a particularly simple manner, to ensure that identically shaped prisms or prisms having identical are used.

It is possible for the main optical path and the secondary optical paths within the stack structure all to lie in one plane. This means that a rotation of the channels may be avoided. In this way, it may be possible to ensure particularly simple arrangement of detectors and/or light sources within the different channels. In particular, the structural space of the optical arrangement may be reduced.

It is possible, for example, for each prism of the stack structure furthermore to comprise an outer surface. The outer surface may be arranged perpendicular to the corresponding secondary optical path. The optical arrangement may furthermore comprise, for at least one prism of the stack structure, an optical plate arranged in the respective secondary optical path adjacent to the outer surface of the corresponding prism. The optical plate may have a first surface and a second surface, which are arranged parallel to one another and furthermore parallel to the corresponding outer surface. For example, different prisms may have optical plates of different thicknesses. For example different thicknesses of the optical plates may ensure that light assigned to different channels of the optical arrangement in each case passes through the same glass path. At the same time, by providing the optical plates, it is possible to ensure a design of the different prisms that is as far as possible identical.

The optical arrangement may for example furthermore comprise, for at least one prism of the stack structure, a further optical wedge having a first surface and a second surface, said further optical wedge being arranged in the corresponding secondary optical path adjacent to the outer surface of the corresponding prism. The first and second surfaces of the further optical wedge may form a wedge angle with one another. The first surface of the further optical wedge may be arranged parallel to the corresponding outer surface. By way of example, a filter may be arranged on the second surface of the optical wedge. Partial reflection may take place at the second surface of the further optical wedge. Providing the further optical wedge makes it possible to achieve a splitting of the corresponding secondary optical path; as a result, it may become possible to provide more than one channel per prism. In this way, the required structural space per channel may be reduced.

In particular, it may be possible for the outer surfaces of second closest adjacent prisms of the stack structure to be parallel to one another. By way of example, the parallel outer surfaces may be arranged offset with respect to one another, e.g. parallel to the respective secondary optical paths. In this way, it is possible to achieve a particularly efficient arrangement of detectors and/or light sources in the different channels. For example, it may be possible to focus detectors and/or light sources in a coupled manner in the different channels, for instance by the different channels being assigned to the same stack section.

For selecting light having specific properties, it is possible for corresponding filters to be provided. For example, it is possible for the optical arrangement to comprise a filter in each case for each prism of the stack structure. The filter may be arranged for example parallel to the corresponding second surface of the corresponding prism. The filter may carry out the partial reflection with regard to the spectral range and/or the polarization and/or the transmission of light.

For example, the filter could be a high-pass filter or a low-pass filter which selectively allows blue light or red light to pass. The filter could also be a bandpass filter which selectively allows light having specific colors of the spectrum to pass. The filter could also be spectrally insensitive, i.e. influence all spectral ranges equally; here the filter could predefine a specific transmission value, for example. The filter could also be a polarization filter which reflects specific polarization of the light.

In particular, it may be worthwhile to implement a correlation between the different spectral ranges associated with the secondary optical paths or the different channels and the stack sections in the stack structure. It would be possible, for example, for the secondary optical paths of prisms of the stack structure which belong to the same stack section of the stack structure to be associated with at least overlapping spectral ranges. Such overlapping spectral ranges may be achieved for example by using corresponding filters that carry out suitable partial reflection with regard to the spectral range. What may be achieved by the association of at least overlapping spectral ranges with the prisms of the stack structure which belong to the same stack section of the stack structure is that the focusing is carried out particularly accurately onto the sensor surfaces of the corresponding detectors. In particular, it is possible to take account of a chromatic aberration, i.e. a wavelength-specific focal length, in the focusing. Accordingly, it would also be possible for the secondary optical paths of prisms of the stack structure which belong to different stack sections in the stack structure to be associated with different spectral ranges. The wavelength-dependent focal length may then be taken into account by suitable focusing of the different stack sections.

It is possible for the optical arrangement to comprise at least one channel in each case for each prism of the stack structure. Each channel may have for example a light source and/or a detector. The light source and/or the detector may be arranged in the corresponding secondary optical path outside the stack structure. For example, it would be possible for the light source and/or the detector to be rigidly coupled in each case to the corresponding prism. By way of example, it would be possible for the detectors/light sources to be directly secured to a corresponding outer surface of the respective prism, for example adhesively bonded by optical cement. A rigid coupling between the detector/light source and the prism may also be implemented by way of a plurality of components; by way of example, the detector may be rigidly coupled to the corresponding prism by way of an optical plate positioned therebetween and/or an optical wedge positioned therebetween. An implementation of the optical arrangement that is particularly efficient in respect of structural space may be carried out in such scenarios. In particular, a relative movement of the detector with respect to the corresponding prism may be dispensable if the focusing and/or the movement stabilization are/is carried out by means of the relative movement of the different stack sections of the stack structure with respect to one another at the at least one interface.

A channel may thus denote those elements which are required for read-out or emission of light along a secondary optical path. The channel may thus enable an external access to the properties of the light of the respective secondary optical path.

By way of example, the light source may be a light emitting diode (LED) or a laser. By way of example, the light source may emit monochromatic light or light in a specific spectral range. By way of example, the light source may emit white light. A further example of a light source is e.g. a display having a plurality of pixels. A further example of a light source is e.g. a digital micromirror device (DMD). Microoptoelectromechanical systems (MOEMS) may also be used as light source.

In principle, it is possible for the optical arrangement to comprise more channels than prisms. In particular, it may be possible to separate more than one channel per prism. This may be done e.g. by means of the further optical wedge mentioned above. Alternatively or additionally, at least one channel may also be assigned to the main optical path. For example, it will be possible for the stack structure to comprise four prisms; at the same time, the optical arrangement may comprise at least five channels, for example seven channels.

For example, the channels may comprise detectors each having a sensor surface. The sensor surface of the detectors of second closest adjacent prisms of the stack structure may be parallel to one another.

For example, each sensor surface may comprise a pixel matrix having a plurality of pixels. By way of example, the sensor surface may be formed by a CMOS sensor or a CCD sensor.

Parallel sensor surfaces may ensure a particularly simple relative arrangement of the different detectors with respect to one another. For example, the different detectors may be applied on a common carrier. It is also possible for the optical arrangement to comprise a positioning mechanism. The positioning mechanism may be configured for example to position the sensor surfaces of the detectors of second closest adjacent prisms, i.e. parallel sensor surfaces, in a coupled manner. In this way, for example, particularly simple focusing may take place. In particular, the positioning mechanism may achieve for example an adjustment of the mutually parallel sensor surfaces by identical absolute values along the different secondary optical paths. For example, the positioning mechanism, which positions two parallel sensor surfaces, may have only a single motor, which is used for the positioning of both sensor surfaces.

It is also possible to carry out a correlated positioning of the sensor surfaces perpendicular to the secondary optical paths parallel to the sensor surface. For example, the sensor surfaces of two of the detectors perpendicular to the corresponding secondary optical path may be offset with respect to one another by a distance that is smaller than the dimensioning of a pixel of the sensor surfaces. In this way, a sub-pixel resolution may be achieved if the information of the different detectors is combined.

In various embodiments, an optical arrangement as described above is used for focusing an image plane of a lens onto a sensor surface of a detector of the optical arrangement.

In further embodiments, an optical arrangement as described above is used for the image stabilization of an image plane of a lens on a sensor surface of a detector of the optical arrangement.

In various embodiments, a lens connection for a lens of a camera comprises a stack structure. The stack structure comprises at least three prisms, each having a first surface and an opposite second surface. The lens connection also comprises a main optical path, which extends through the stack structure. The lens connection also comprises, in each case for each of the prisms of the stack structure: a secondary optical path, which extends through the corresponding prism and which is connected to the main path by partial reflection of light at the second surface of the corresponding prism. The lens connection also comprises at least one interface. Each of the at least one interface is arranged between a corresponding first stack section of the stack structure and a corresponding second stack section of the stack structure. Each of the at least one interface is configured to enable relative movement of the corresponding first stack section and of the corresponding second stack section with respect to one another.

The at least one interface is configured to enable the relative movement parallel to a beam path of light between the lens and an image plane of the lens. In this way, focusing of the image plane onto a sensor surface of a corresponding detector may be achieved by varying the light path between the lens and the detector.

For example, the lens connection may comprise the optical arrangement as described above.

In accordance with one embodiment, an optical arrangement comprises a stack structure. The stack structure comprises at least three mirrors. Each of the at least three mirrors has a partly reflective surface. The optical arrangement also comprises a main optical path, which extends through the stack structure. The optical arrangement also comprises, in each case for each of the mirrors of the stack structure: a secondary optical path, which is connected to the main path by partial reflection of light at the surface of the corresponding mirror. The optical arrangement also comprises at least one interface. Each of the at least one interface is arranged between a corresponding first stack section of the stack structure and a corresponding second stack section of the stack structure. Each of the at least one interface is configured to enable relative movement of the corresponding first stack section and of the corresponding second stack section with respect to one another.

In various embodiments, a lens connection for a camera is provided. The lens connection comprises a stack structure comprising at least four prisms. Each of the at least four prisms has in each case a first surface and an opposite second surface. The lens connection also comprises a main optical path, which extends through the stack structure. The lens connection comprises, in each case for each of the prisms of the stack structure, a secondary optical path, which extends through the corresponding prism and which is connected to the main optical path by partial reflection of light at the second surface of the corresponding prism and which experiences total internal reflection at the first surface of the corresponding prism. It is possible for all adjacent surfaces of prisms of the stack structure that are arranged alongside one another to be parallel to one another.

For example, the lens connection may comprise the optical arrangement according to a further exemplary embodiment.

For such a lens connection it is possible to achieve effects that are comparable with the effects that may be achieved for the optical arrangement in accordance with further embodiments.

In accordance with one embodiment, an optical arrangement comprises a stack structure. The stack structure comprises at least three prisms. Each of the prisms has a first surface and an opposite second surface. The optical arrangement also comprises a main optical path, which extends through the stack structure. The optical arrangement also comprises, in each case for each of the prisms of the stack structure, a secondary optical path, which extends through the corresponding prism and which is connected to the main optical path by partial reflection of light at the second surface of the corresponding prism and which experiences total internal reflection at the first surface of the corresponding prism. The optical arrangement also comprises a wedge having a first surface and a second surface. The wedge is arranged in the main optical path adjacent to the first surface of an outer prism of the stack structure. The second surface of the wedge is arranged parallel to the first surface of the outer prism. All adjacent surfaces of prisms of the stack structure that are arranged alongside one another are parallel to one another. The features set out above and features that are described below may be used not only in the corresponding combinations explicitly set out, but also in further combinations or in isolation, without departing from the scope of protection of the present invention.

BRIEF DESCRIPTION OF THE FIGURES

FIG. 11 schematically illustrates a multi-way prism in accordance with various embodiments which comprises two interfaces, three stack sections and two motors for driving a relative movement between the different stack sections.

FIG. 12 schematically illustrates a multi-way prism in accordance with various embodiments which comprises two interfaces and one motor for driving a relative movement between the different stack sections.

FIG. 14 illustrates a multi-way prism in accordance with various embodiments, wherein the multi-way prism comprises an interface that separates a first stack section from a second stack section.

DETAILED DESCRIPTION OF EMBODIMENTS

Figure 1:
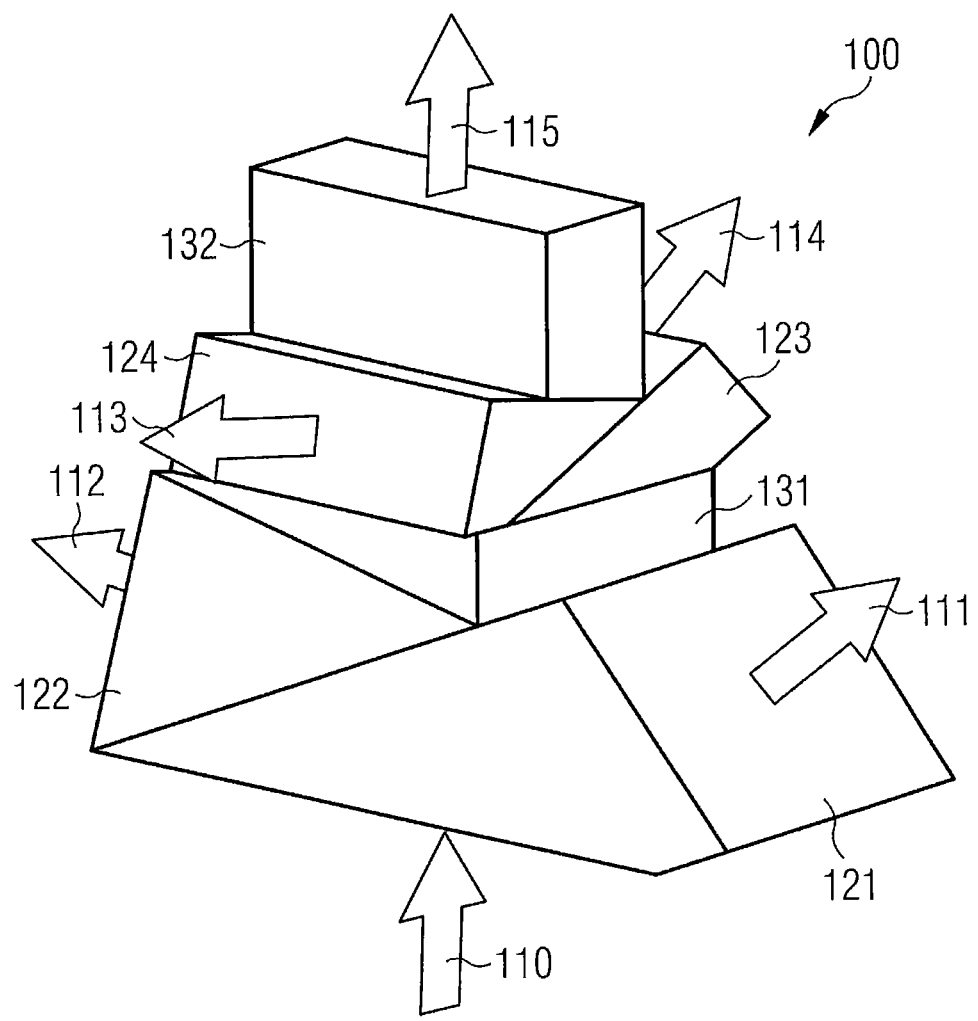
FIG. 1 illustrates a multi-way prism which is known from the prior art.

The properties, features and advantages of this invention described above and the way in which they are achieved will become clearer and more clearly comprehensible in association with the following description of the exemplary embodiments which are explained in greater detail in association with the drawings.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art. Connections and couplings between functional units and elements as illustrated in the figures may also be implemented as an indirect connection or coupling.

Techniques for combining or splitting light are described below. In this case, in accordance with various examples, light may be split/combined with regard to the spectral range, the polarization and/or the intensity/transmission.

The techniques described herein are based on the use of a multi-way prism. In various examples, the multi-way prisms described herein comprise four channels, five channels, six channels, seven channels or more channels. The multi-way prisms described herein comprise a stack structure comprising a plurality of prisms. For example, the stack structure may comprise three or more prisms.

Such optical arrangements may be used in a wide variety of arrangements. One exemplary application is an illumination/projection device. In this case, it is possible to implement for example the combination of information from four, five or more different channels with assigned light sources—for example light sources having different spectra or displays, MOEMS or DMDs. It is possible to produce, for example, a sub-pixel superimposition by means of a corresponding offset between the light sources of the different channels. Further applications comprise for example the input coupling of laser pointers, markers, autofocus beam paths, calibration beam paths or measurement beam paths.

A further exemplary application concerns a detection device, such as a camera, for instance. In this case, image information is split into the different channels. For example, the splitting may be carried out with regard to different spectral ranges. In such an example, too, a sub-pixel superimposition by means of a corresponding offset between the detectors of the different channels may be worthwhile, for example in order to obtain images having increased resolution.

In association with a camera, the different channels may be used for example for applications in the area of autofocus technology, imaging with different light sensitivities, spectral measurements or polarization measurements.

In various examples, the multi-way prism comprises a stack structure divided into a plurality of stack sections. Two adjacent stack sections may be separated from one another in each case by an interface, such that these stack sections are movable relative to one another. The interface ensures the relative movement. By virtue of the relative movement of different stack sections with respect to one another, the main optical path and/or the secondary optical paths which are associated with the different prisms may be influenced and adapted. The various applications as described above may benefit as a result. For example, focusing and/or image stabilization may become possible for the various optical applications as described above.

One possibility for adapting the optical paths consists in the displacement of the secondary optical paths relative to the corresponding prisms. The image stabilization may be made possible as a result. A further possibility for adapting the secondary optical paths consists in shortening or lengthening the light path to the detector 281. The focusing may be achieved as a result.

In comparison with reference implementations, the techniques described herein enable a multi-way prism which requires comparatively little structural space. Furthermore, the corresponding multi-way prism may have a comparatively low weight. The complexity of the design of the corresponding multi-way prism may also be comparatively low. The mechanical outlay for production may be reduced as a result. In particular, by means of the techniques described herein it may be possible to adapt the optical paths particularly efficiently in respect of structural space. In particular, it may be possible to dispense with a positioning mechanism in the region of an outer surface of the different prisms, for example in the region of detectors and/or light sources.

Figure 2:
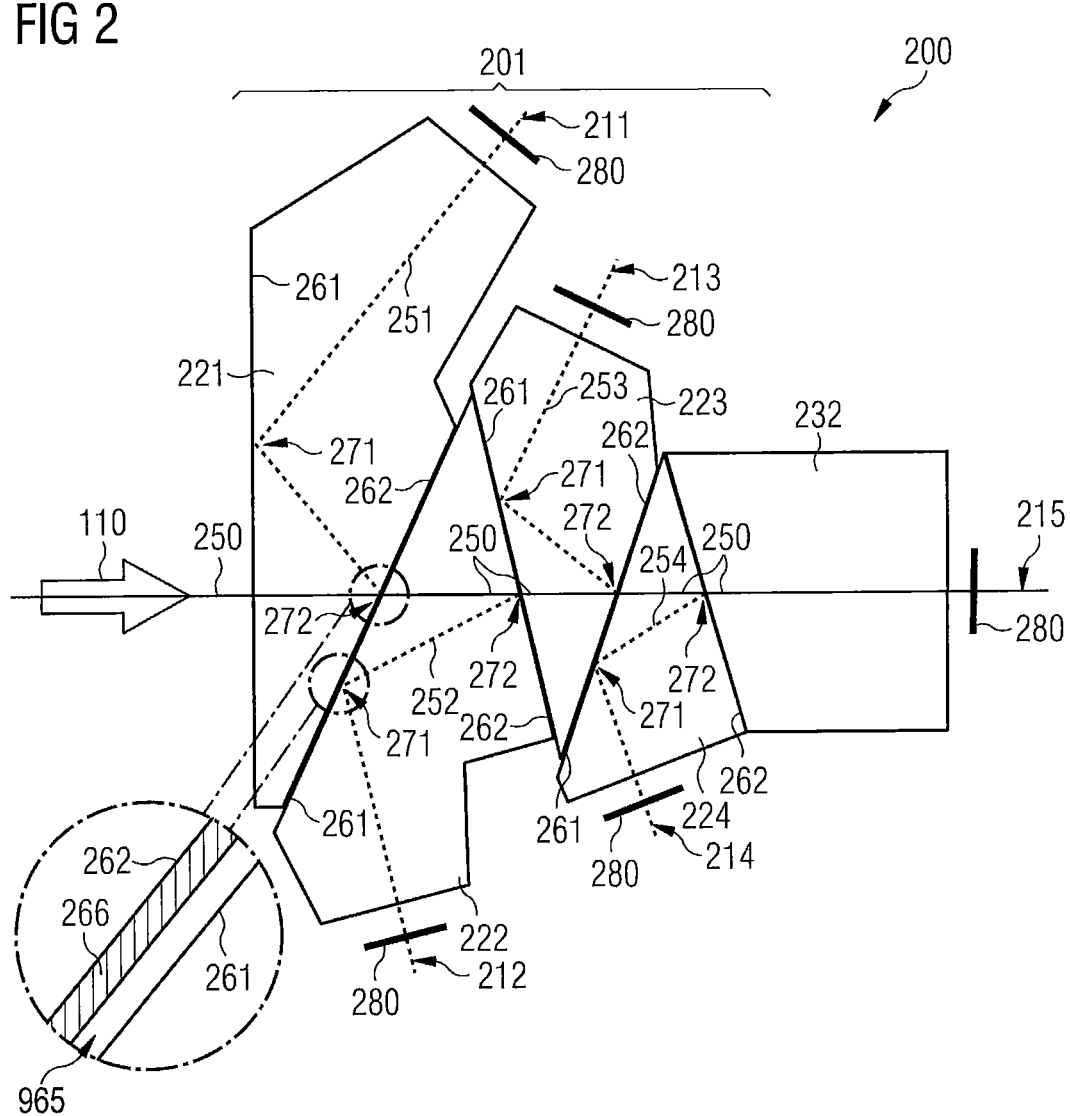
FIG. 2 illustrates a multi-way prism in accordance with various embodiments, wherein the multi-way prism comprises four prisms and five channels.

FIG. 2 illustrates one exemplary multi-way prism. In the corresponding optical arrangement 200, four prisms 221, 222, 223, 224 are arranged sequentially. Incident light 110 passes along a main optical path 250 firstly through the outer prism 221 and then through the further prisms 222, 223, 224. The prisms 221, 222, 223, 224 form a stack structure 201. In this case, the prisms 221-224 are stacked in such a way that the main optical path 250 alternately crosses first surfaces 261 and second surfaces 262 of the prisms 221-224.

FIG. 2, bottom left, illustrates an enlarged view of the transition between a second surface 262 and a first surface 261 by way of example for the prisms 221, 222. The enlarged view is illustrated by way of example for two positions along the boundary between the prisms 221, 222. In various examples, the transition has no dependence on the position along the boundary between the prisms 221, 222. It is thus possible for the surfaces 261, 262 to be formed uniformly.

It is evident from the enlarged view in FIG. 2 that an air gap 965 is present between the surfaces 261, 262. The air gap 965 is formed between the filter 266 and the surface 261 in the example in FIG. 2. The air gap 965 brings about total internal reflection at the surface 261 as a result of the sufficiently large angles of incidence of light that is partly reflected by the surface 262.

Total internal reflection typically takes place if:

sine(angle of incidence)*Refractive index before
surface>Refractive index after surface, wherein the angle of incidence is defined as the angle relative to the perpendicular to the surface.

It is evident from FIG. 2 that transitions between different optical media—for example air and glass in FIG. 2—along the main optical path 250 within the stack structure 201 are formed only by the surfaces of the prisms 221-224 of the stack structure 201. Further optical elements such as e.g. wedges or plates are not present within the stack structure 201 in the example in FIG. 2.

In particular, in the example in FIG. 2 the stack structure 201 is not divided into a plurality of stack sections: the different prisms 221-224 of the stack structure 201 are not movable relative to one another. This means that the stack structure 201 is movable only in continuous fashion. For example, the different prisms 221-224 of the stack structure 201 may be rigidly coupled to one another. For example, it would be possible for the different prisms 221-224 to be adhesively bonded to one another or to be fixed to one another in some other way.

The stack structure 201 comprises a filter 266 for each prism, said filter being arranged parallel to the corresponding second surface 262. For example, the corresponding second surface may integrally form the respective filter 266, i.e. comprise the latter. The filter 266 selects light having specific optical properties upon partial reflection 272 at the second surface 272. In this case, the filter 266 may have different filter characteristics, for example with regard to the filtered spectral range; the filtered polarization; and/or the filtered intensity, i.e. transmission.

It is furthermore evident from FIG. 2 that all adjacent surfaces 261, 262 of prisms 221-224 of the stack structure 201 that are arranged alongside one another are parallel to one another: in this regard, the second surface 262 of the prism 221 is parallel to the first surface 261 of the prism 222; furthermore, the second surface 262 of the prism 222 is parallel to the first surface 261 of the prism 223; furthermore, the second surface 262 of the prism 223 is parallel to the first surface 261 of the prism 224. By virtue of such a parallel arrangement of adjacent surfaces of prisms 221-224 that are arranged alongside one another, it is possible to achieve a particularly small design of the stack structure 201 and thus of the optical arrangement 200.

As a result of the partial reflection 272 of light at the second surface 262, per prism 221-224 a respective secondary optical path 251, 252, 253, 254 is connected to the main optical path 250. In the case of incident light 110, as illustrated in FIG. 2, the partial reflection 272 brings about splitting of the main optical path 250. Correspondingly, however, it would also be possible to achieve combination of light by means of the partial reflection 272. The different secondary optical paths 251-254 experience the total internal reflection 271 at the first surface 261 of the respective prism 221-224. Bauernfeind prisms may be formed as a result. In principle, sufficiently large angles of incidence of the secondary optical paths 251-254 on the first surface 261 cause the total internal reflection 271. Therefore, it is worthwhile to choose the geometry of the stack structure 201 and of the different prisms 221-224 in such a way that the angles of incidence of the secondary optical paths 251-254 on the first surface 261 are sufficiently large.

In the example in FIG. 2, the optical arrangement 200 comprises five channels 211, 212, 213, 214, 215. In the example in FIG. 2, each channel comprises a detector 280 arranged in the secondary optical path 251-253 outside the respective prism and thus outside the stack structure 201. One detector 280 is thus provided per channel 211-215, said detector being arranged perpendicular to the respective optical path 250-254. In other examples, a light source could also be provided. In this case, one channel 211-214 is respectively formed per prism 221-224. In other examples, however, it is also possible for more than one channel to be formed per prism 221-224. In the example in FIG. 2, a further channel 215 is formed by the main optical path 250. In order to achieve identical glass paths, the different prisms 221-224 all have different shapes; furthermore, provision is made of an optical block 232 adjacent to the prism 224.

In the example in FIG. 2, the main optical path 250 and the secondary optical paths 251-254 all lie in one plane (the plane of the drawing in the example in FIG. 2). This enables a small design of the optical arrangement 200, e.g. in comparison with the reference implementation in accordance with FIG. 1.

In the example in FIG. 2, the different prisms 221-224 have identical prism angles. The prism angle is defined in each case between the first surface 261 and the second surface 262. However, examples are also possible in which the prisms of the stack structure 201 have different prisms angles.

Figure 3:
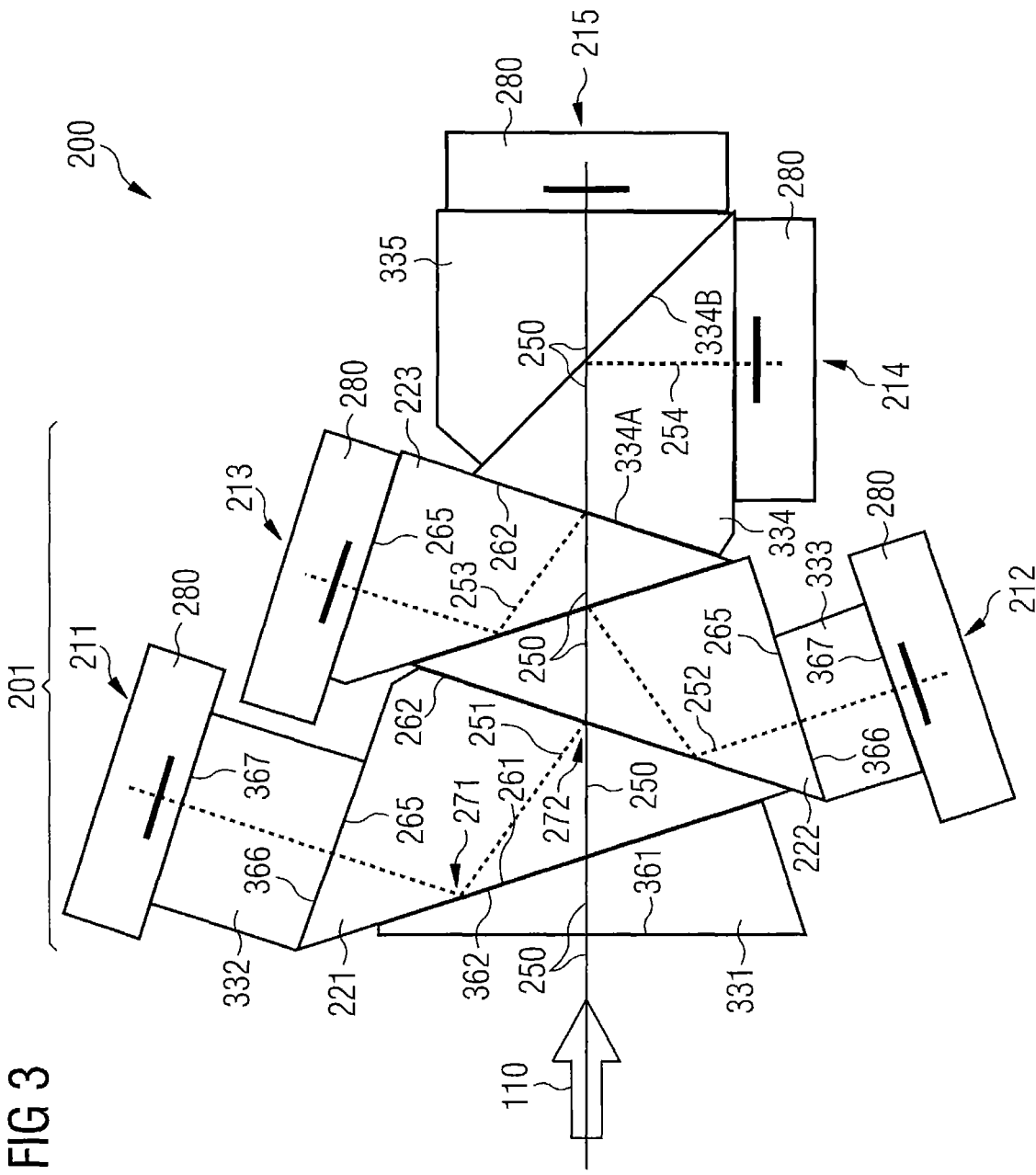
FIG. 3 illustrates a multi-way prism in accordance with various embodiments, wherein the multi-way prism comprises three prisms and five channels, wherein the multi-way prism furthermore comprises a wedge arranged in front of an outer prism.

FIG. 3 illustrates a further exemplary multi-way prism 200. In the multi-way prism 200 in accordance with the example in FIG. 3 as well, the prism angle between the first surface 261 and the second surface 262 is identical for all prisms 221-223 of the stack structure 201. It is evident from FIG. 3 that the stack structure 201 comprises only three prisms 221-223, wherein the partial optical paths 251-253 experience partial reflection 272 at the respective second surface 262 of the corresponding prism 221-223 and total internal reflection 271 at the respective first surface 261 of the corresponding prism 221-223.

In the example in FIG. 3, the optical arrangement 200 furthermore comprises a wedge 331 having a first surface 361 and a second surface 362. The first surface 361 and the second surface 362 define a wedge angle of the wedge 331. The wedge 331 is arranged in the main optical path 250 adjacent to the first surface 261 of the outer prism 221 of the stack structure 201. The second surface 362 of the wedge 331 is parallel to the first surface 261 of the outer prism 221. For example, with regard to the wedge 331, too, it is possible for an air gap to be present between the second surface 362 of the wedge 331 and the first surface 261 of the outer prism 221, said air gap bringing about the total internal reflection 271 of light along the secondary optical path 251 in the prism 221 (not illustrated in FIG. 3).

In the example in FIG. 3, the wedge angle of the wedge 331 is 50%, that is to say is of half the magnitude of the prism angles of the prisms 221-223 of the stack structure 201. Furthermore, the wedge 331 fosters smaller angles of incidence of the main optical path 250 on the respective second surfaces 262 of the prisms 221-223; moreover, the wedge 331 fosters larger angles of incidence of the respective secondary optical paths 251-253 on the first surface 261 of the corresponding prism 221-223. What is attained as a result is that a smaller reflectance of the partial reflection 272 and reliable total internal reflection 271 are achieved, i.e. robustness vis-à-vis tolerances is achieved. The solid angle from which light may be focused onto sensor surfaces of the detectors 280 of the different channels 211-215 is increased as a result.

It is furthermore evident from FIG. 3 that all the prisms 221-223 of the stack structure are shaped identically. This enables simple and efficient production of the prisms 221-223. In order to obtain identical glass paths, the optical arrangement 200 furthermore comprises optical plates 332, 333, which are arranged adjacent to outer surfaces 265 of the prisms 221, 222. The optical plates 332, 333 each comprise a first surface 366 and a second surface 367. The first surface 366 and the second surface 367 are in each case arranged parallel to one another. Moreover, the first surface 366 and the second surface 367 are arranged parallel to the respective outer surface 265 of the corresponding prism 221, 222. This prevents the secondary optical path 251, 252 from being deflected or refracted.

FIG. 3 furthermore illustrates aspects with regard to a further optical wedge 334 having a first surface 334A and a second surface 334B, which form a wedge angle with one another. The further optical wedge 334 also acts as a prism, wherein partial reflection 272 occurs only at the second surface 334B; total internal reflection of the secondary optical path 254 produced in this way does not occur within the wedge 334. In this respect, the further optical wedge 334 does not form a Bauernfeind prism either. The first surface 334A of the further optical wedge 334 is parallel to the second surface 262 of the prism 223; for example, an air gap could once again be provided (not shown in FIG. 3). A further optical wedge 335 is arranged behind the further optical wedge 334.

The further optical wedges 334, 335 define two further channels 214, 215. As a result, the multi-way prism in accordance with the example in FIG. 3 comprises three prisms 221-223 and five channels 211-215.

Figure 4:
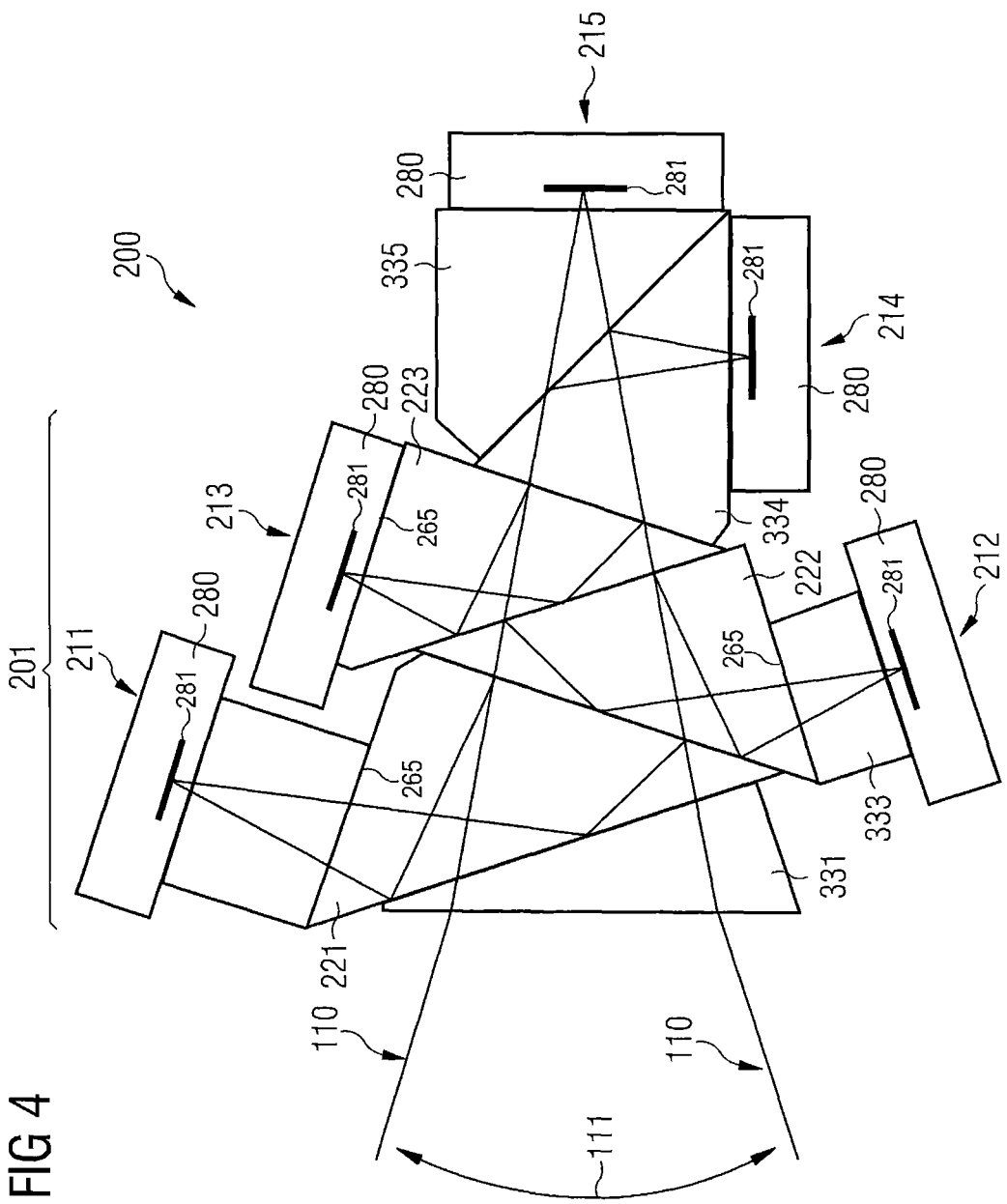
FIG. 4 schematically illustrates the beam path of light through the multi-way prism from FIG. 3.

FIG. 4 illustrates aspects with regard to the beam path of light 110 through the optical arrangement 200 from FIG. 3. It is evident from FIG. 4 that light 110 may be incident on the optical arrangement 200, or in particular the wedge 331, from a comparatively large solid angle 111 and is nevertheless focused onto the detectors 280 of the different channels 211-215. This is made possible by small angles of incidence at the first surfaces 261 of the prisms 221-223 or of the wedge 331.

It is evident from FIG. 4 that the beam path 110 defines image planes for the different channels 211-215. In the example in FIG. 4, the image plane is focused onto the sensor surfaces of the corresponding detectors 281. The beam path 110 extends convergently toward the sensor surfaces 281. The beam path 110 may be influenced for example by a lens arranged in front of the wedge 331 or in front of the stack structure 201 (not illustrated in FIG. 4).

In FIG. 4, the different prisms of the stack structure 201 are once again not movable relative to one another. In order nevertheless to achieve focusing of the image planes onto the sensor surfaces 281, positioning mechanisms may be provided (not illustrated in FIG. 4), which the detectors 280 in each case relative to the outer surfaces 265 of the prisms 221, 222, 223 in order in this way to vary the light path within the multi-way prism 200.

Figure 5:
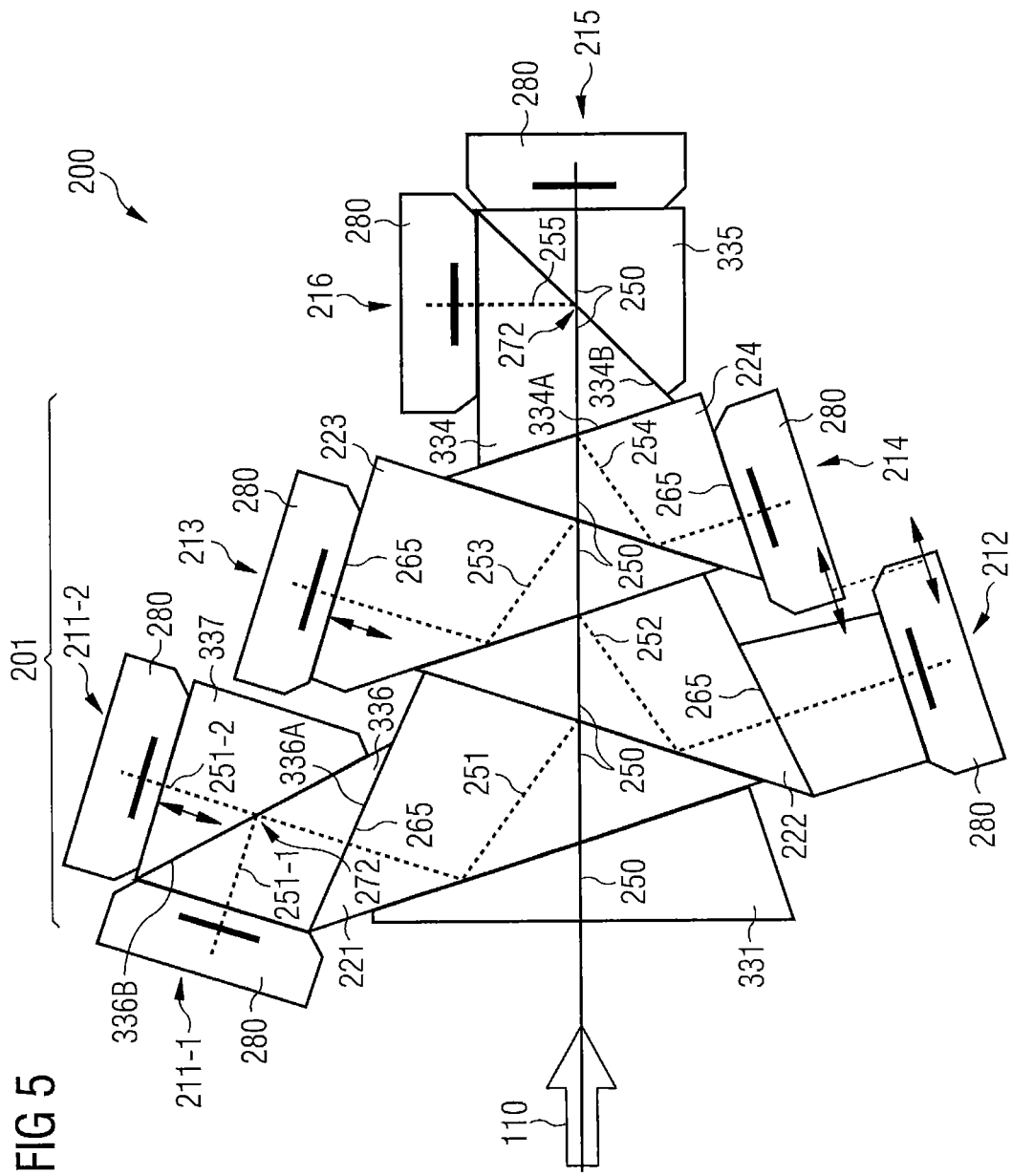
FIG. 5 illustrates a multi-way prism in accordance with various embodiments, wherein the multi-way prism comprises four prisms and seven channels, wherein the multi-way prism further comprises a wedge arranged in front of an outer prism.

FIG. 5 illustrates a further exemplary multi-way prism 200. The prisms 221-224 of the multi-way prism 200 are rigidly connected to one another and may not be moved relative to one another. In the corresponding optical arrangement 200 in accordance with the example in FIG. 5—comparable with the example in FIG. 3—the prism angle between the first surface 261 and the second surface 262 is identical for all the prisms 221-224 of the stack structure 201. In the example in FIG. 5, however, the stack structure 201 comprises four prisms 221-224. The optical arrangement 200 defines seven channels 211-1, 211-2, 212-216. In this case, a further optical wedge 336 is arranged parallel to the outer surface 265 of the outer prism 221, that is to say that a first surface 336A of the further optical wedge 336 is arranged parallel to the outer surface 265 of the prism 221. Partial reflection of light of the secondary optical path 251 takes place at a second surface 336B of the further optical wedge 336, as a result of which the secondary optical paths 251-1, 251-2 are produced. In the various examples described herein, such further optical wedges 336, 337 may be used to increase the number of channels per prism 221-224 of the stack structure 201.

In the example in FIGS. 3-5, it is evident that second closest adjacent prisms 221-224 have outer surfaces 265 arranged parallel to one another. For example, the outer surface 265 of the prism 221 is parallel to the outer surface 265 of the prism 223 (cf. FIGS. 3-5). Furthermore, in the example in FIG. 5, the outer surface 265 of the prism 222 is parallel to the outer surface 265 of the prism 224. Since the outer surfaces 265 of the different prisms 221-224 are arranged parallel to one another, it is possible for the detectors 280 and/or light sources (not illustrated in FIGS. 3-5) also to be arranged parallel to one another. In particular, for example, the sensor surfaces of the detectors 280 of second closest adjacent prisms may be arranged parallel to one another. By means of a positioning mechanism, it may then be possible for such detectors 280 arranged parallel to one another to be positioned in a coupled manner. The positioning mechanism may vary a distance between the respective detector 280 and the corresponding outer surface 265. To that end, provision may be made for the respective detector 280 not to be rigidly connected to the corresponding outer surface 265. For example, it is possible to carry out a positioning parallel to the respective secondary optical path, for the purpose of focusing in a coupled manner (illustrated in FIG. 5 by the arrows along the secondary optical paths 251-2, 253). Alternatively or additionally, it would also be possible to arrange the detectors 280 perpendicular to the secondary optical paths in a correlated manner and/or to position them in a coupled manner (illustrated in FIG. 5 by arrows along the detectors 280 of the channels 212, 214). By way of example, in the example in FIG. 5, the sensor surfaces of the detectors 280 of the channels 212, 214 may be offset with respect to one another by a distance perpendicular to the secondary optical paths 252, 254 which is smaller than the dimensioning of a pixel of the sensor surfaces. By combining the sensor data from said detectors 280, it is then possible to provide an image having increased resolution. A sub-pixel superimposition is possible.

Figure 6:
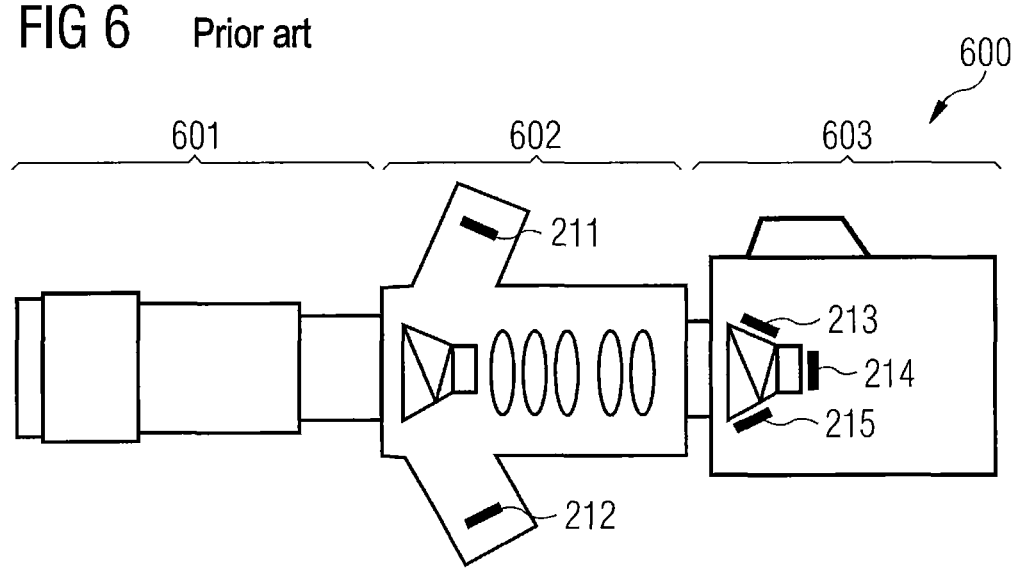
FIG. 6 illustrates a camera having two multi-way prisms in accordance with the prior art.

FIG. 6 illustrates aspects with regard to a camera 600 in accordance with the prior art. The camera 600 comprises a lens 601, a first lens connection 602 and a second lens connection 603. The camera may also comprise a camera body arranged to the right of the lens connection 603 (not illustrated in FIG. 6). The first lens connection 602 is used to provide two channels 211, 212; the channels 211, 212 may be used for example for infrared imaging and ultraviolet imaging. The second lens connection 603 comprises a multi-way prism having three channels 213, 214, 215, which may correspond to the three color channels, red, green and blue, for example.

It is evident from FIG. 6 that two lens connections 602, 603 are required in order to provide all the channels 211-215. Accordingly, the camera 600 is heavy and unwieldy. Furthermore, keeping two lens connections 602, 603 available is comparatively expensive and error-prone.

Figure 7:
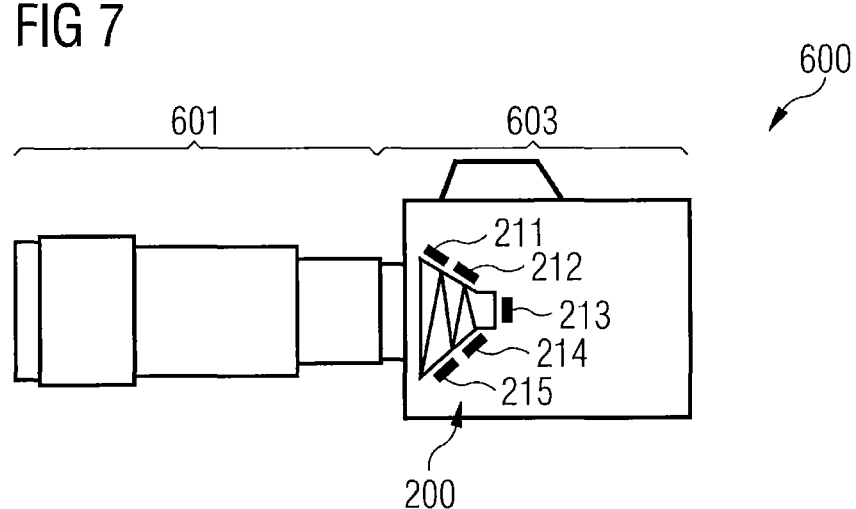
FIG. 7 illustrates a camera in accordance with various embodiments, wherein a lens connection of the camera comprises a multi-way prism in accordance with various embodiments.

FIG. 7 illustrates aspects with regard to a camera 600 comprising an optical arrangement 200 in accordance with various exemplary implementations as described above. The camera 600 comprises the lens 601 and the lens connection 603. The camera may once again comprise a camera body arranged to the right of the lens connection 603 (not illustrated in FIG. 7). The lens 601 may be a zoom lens, for example, which provides different focal lengths. The lens connection 603 comprises a multi-way prism in accordance with various examples disclosed herein having five channels 211-215. The comparatively small structural space required by the multi-way prism 200 makes it possible to provide all five channels 211-215 in the lens connection 603. This is the case in particular in connection with a so-called B4 lens connection. The B4 lens connection defines mechanical and optical properties. The standard for TV cameras that is known as "B4" lens connection is defined in the following document: "BTA S-1005B" "Interconnection for HDTV Studio Equipment" from ARIB "Association of Radio Industries and Businesses"/Japan.

It describes the optical parameters on pages 19 and 20, and the geometric values on page 26. The definition stipulates that between the lens and the image sensors there must be a prism block having the following properties:

Thickness of the entire glass path 46.2 mm;

33.0 mm glass A having a refractive index of 1.52 to 1.75 and an Abbe number of 42.5 to 50.5; and 13.2 mm glass B glass type BK7.

In reference implementations, use is made of a multi-way prism having three channels (cf FIG. 6) in a B4 lens connection. The three channels correspond to the spectral ranges red, green and blue. In addition to the channels red, green and blue, further wavelength ranges, such as, for example, ultraviolet or infrared wavelengths, may not be taken into account in such reference implementations on account of the limited structural space of the lens connection. One exemplary application in which infrared wavelengths are of interest is, for example, the identification of advertising boards in sports transmissions. On the basis of an encoding of the advertising boards in the infrared spectral range, they may be detected in digital post-processing and the corresponding pixels may be modified. For example, a user-specific adaptation may be carried out in this way. A further exemplary implementation for encoding regions with light in the infrared spectral range concerns the separation of foreground and background; for example, pixels in the region of the background may be digitally replaced. Such techniques are known for example as Supponer methods. Such applications may be implemented with a lens connection in accordance with FIG. 7.

While an integration of the multi-way prism 200 into the lens connection 603 is illustrated in the example, the beam splitting functionality of the multi-way prism 200 could also be integrated directly into a camera body of the camera in other examples.

In order to further reduce the structural space required by the multi-way prism 200, in various examples it may be worthwhile to dispense wholly or at least partly with a positioning mechanism used in the region of the detectors 280. In order nevertheless to enable for example focusing in relation to the sensor surfaces of the detectors 280—for instance in association with different lenses 601 and/or zoom lenses 601—it may be worthwhile to modify in some other way the path covered by light through the multi-way prism 200 (light path). In particular, it may be worthwhile to adapt the light path specifically for the different channels 211-215.

A description is given below of, inter alia, corresponding techniques which enable the light path to be altered by relative movement of the different prisms of the stack structure 201 with respect to one another. In this case, these techniques may be combined with the techniques for the configuration of the multi-way prism 200 as described with reference to FIGS. 2-7.

Figure 8:
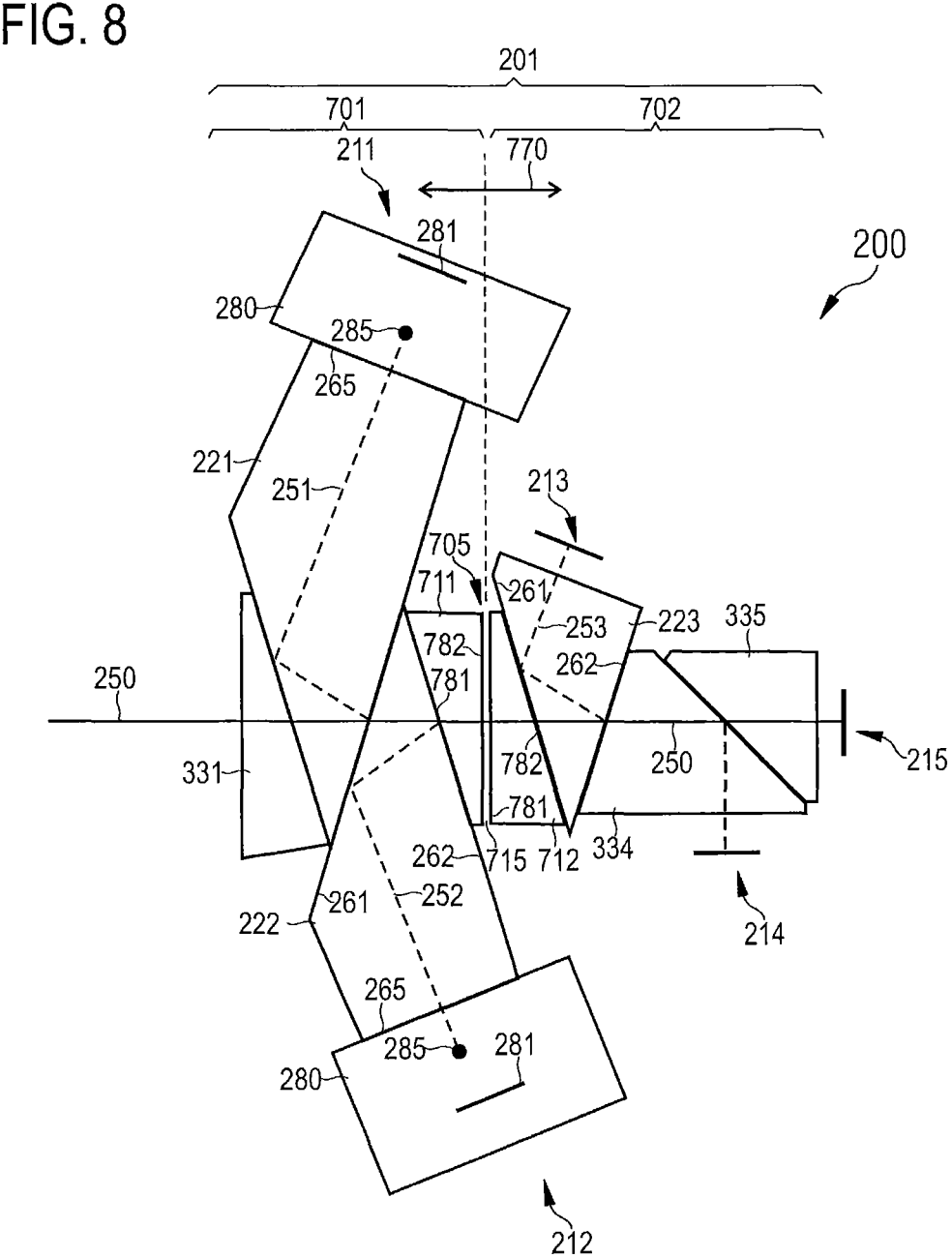
FIG. 8 illustrates a multi-way prism in accordance with various embodiments, wherein the multi-way prism comprises an interface that separates a first stack section from a second stack section.

FIG. 8 illustrates aspects with regard to the adaptation of the light path through the optical device. FIG. 8 illustrates a multi-way prism 200, which in principle corresponds to the multi-way prisms 200 described in association with FIGS. 2-5. The various examples that have been described above with reference to FIGS. 2-5 could also be implemented for the multi-way prism 200 in FIG. 8. In particular, the various techniques, for example with regard to the geometric configuration of the prisms 221-223, etc., may also be applied to the multi-way prism 200 in FIG. 8.

In the case of the multi-way prism 200 in FIG. 8, the stack structure 201 comprises two stack sections 701, 702. The stack section 701 comprises the prisms 221,222 and the wedge 331; the stack section 702 comprises the prism 223 and the wedges 334,335. In this case, within the first stack section 701, the prism 221 is rigidly coupled to the prism 222 and the wedge 331. Within the stack section 702, the prism 223 is rigidly coupled to the wedges 334, 335.

The two stack sections 701, 702 are separated from one another by an interface 705. The two stack sections 701, 702 are movable relative to one another; in FIG. 8, the direction of the relative movement 770 is indicated. To that end, provision is made for the interface 705 not to implement a rigid coupling between the adjacently arranged prisms 222, 223. Rather, the interface 705 comprises an air gap 715 between two wedges 711, 712 assigned to the interface 705.

The wedge 711 and the wedge 712 each have a first surface 781 and a second surface 782. It is evident from FIG. 8 that the first surface 781 of the wedge 711 is parallel to the second surface 762 of the adjacent prism 222. Moreover, the second surface 782 of the wedge 712 is parallel to the first surface 261 of the adjacent prism 223. The second surface 782 of the wedge 711 is also parallel to the first surface 781 of the wedge 712, wherein the air gap 715 extends between these surfaces 781, 782. In particular, the second surface 782 of the wedge 711 and the first surface 781 of the wedge 712 are in each case perpendicular to the main optical path 250. This prevents partial reflection of light from occurring at the interfaces between the wedges 711, 712 and the air gap 715.

In the example in FIG. 8, the detector 280 of the channel 211 is rigidly coupled to the prism 221 of the corresponding secondary path 251. In particular, in the example in FIG. 8, the detector 280 is adhesively bonded to the outer surface 265 of the prism 221 by optical cement. The same correspondingly applies to the detector 280 of the channel 212. By virtue of the detectors 280 being directly adhesively bonded to the prisms 221, 222, the detectors 280 may be secured in a particularly positionally stable manner. If the detectors 280 have to be cooled for example for a high sensitivity in the region of the infrared spectral range, on account of the direct adhesive bonding it is not possible for condensation to arise in the region of the protective glass of the detector 280 and/or in the region of the outer surface 265.

It is evident from the example in FIG. 8 that an image plane 285 is defocused with respect to the sensor surfaces 281 of the detectors 280 of the channels 211, 212. In particular, the image plane 285 is offset relative to the sensor surfaces 281. Therefore, focusing necessitates adapting the light path along the secondary paths 251 and the main path 250, i.e. within the optical device 200, for the channels 211, 212.

Figure 9:
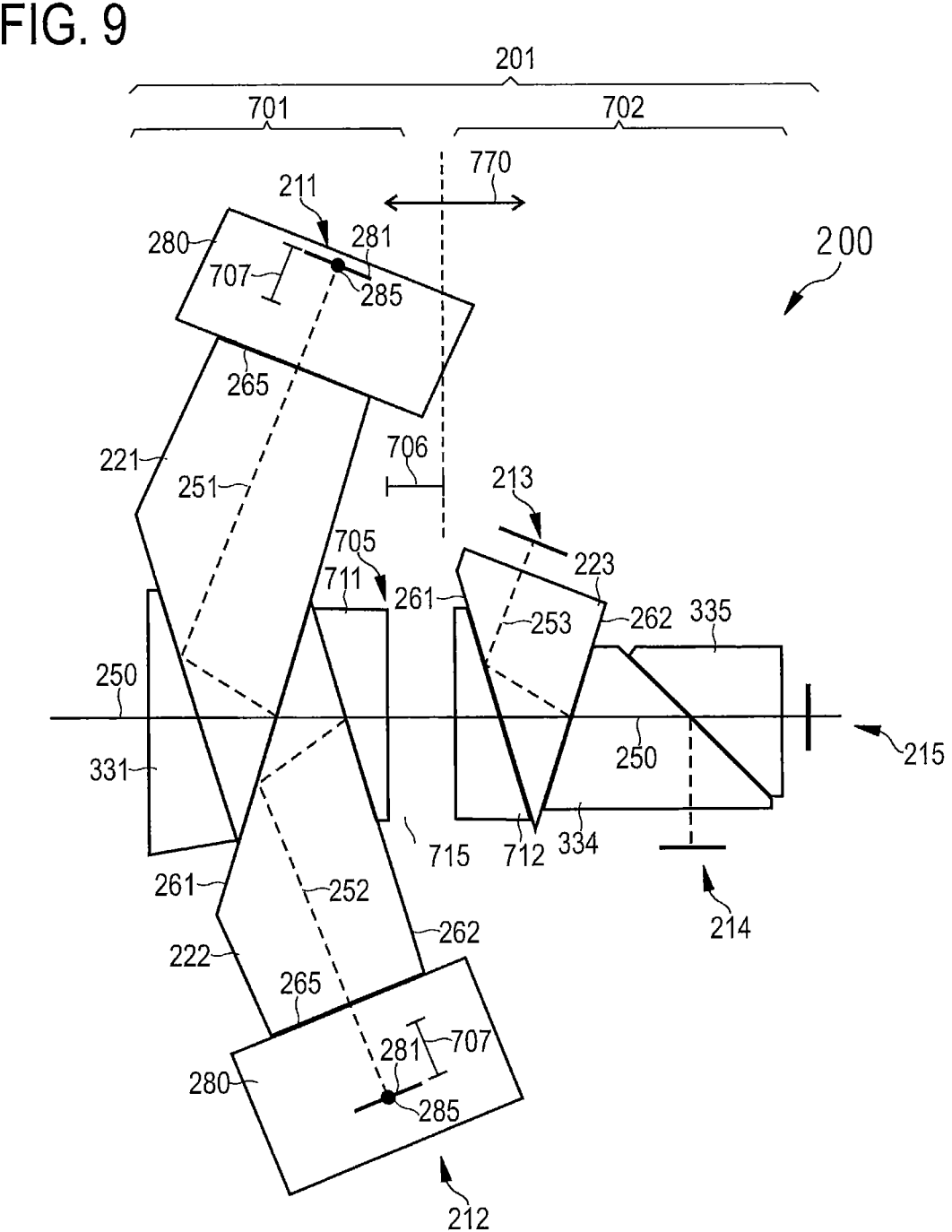
FIG. 9 illustrates the multi-way prism from FIG. 8 after relative movement of the first stack section and of the second stack section with respect to one another in a different positioning.

FIG. 9 illustrates aspects with regard to adapting the light path. FIG. 9 illustrates the multi-way prism 200 from FIG. 8 in a different state, which is made possible by the relative movement 770 of the stack section 701 and of the stack section 702 with respect to one another.

In the example in FIG. 9, the stack section 701 was moved toward the left relative to the stack section 702 by a specific distance 706 (cf. FIGS. 8 and 9). In this case, the stack section 702 remained stationary. As a result, the light path for the channels 211 and 212 was shortened by the corresponding distance 707. In this way, focusing of an image plane 285 defined by the beam path 110 (not illustrated in FIG. 9) onto the sensor surface 281 of the detectors 280 of the channels 221, 212 may be carried out. In particular, in such an example it may be dispensable to provide for the detectors 280 of the channels 211, 212 a positioning mechanism that moves the respective detector 280 in relation to the outer surface 265 of the respective prism 221, 222. For example, it would be possible for the detectors 280 of the channels 211,212 to be fixedly or rigidly coupled to the respective prism 221, 222. This may enable an implementation that is particularly efficient in respect of structural space. Moreover, the complexity of the mechanism used in the region of the outer surfaces 265 may be greatly reduced, for example in comparison with an implementation based on a positioning mechanism.

While a shortening of the light path was illustrated in the example in FIG. 9, alternatively or additionally it would also be possible to lengthen and/or to shorten the light path by means of suitable dimensioning of the relative movement 770. Corresponding focusing is also possible for the stack section 702.

In order to enable focusing over a large range, it may be worthwhile to enable the largest possible travel with regard to the relative movement 770. For example, a travel, i.e. a maximum change in the position of the first stack structure 701 in relation to the second stack structure 702, could be made possible which is not less than 500 µm, preferably not less than 250 µm, particularly preferably not less than 100 µm.

In the example in FIGS. 8 and 9, the stack sections 701, 702 in each case comprise two prisms and respectively one prism 221-223. In general, it would be possible for the different stack sections 701,702 to comprise a larger or smaller number of prisms. In general, it would be possible for each stack section 701, 702 to comprise only a single prism. In this way, it is possible to carry out a particularly efficient adaptation of the light path individually in relation to each channel; on the other hand, however, a larger structural space may be required and the complexity may be increased.

In the example in FIG. 8, the stack section 701 comprises the two prisms 221, 222. In this case, the outer surfaces 265 of the prisms 221, 222 substantially face away from one another or are oriented in different directions. This means that opposite channels belong to a common stack section 701. In particular, the corresponding secondary optical paths 251,252 in the region of the outer surfaces 265 of the corresponding prisms 221,222 form an angle with one another that is greater than 150°. What may be achieved as a result is that the corresponding detectors 280 may be connected to the stack structure 201 with a particularly small structural space.

It is evident from FIG. 9 that the relative movement 770 influences the light path within the prisms 221, 222 of the stack section 701 in the same way. In particular, the light path is shortened by the same distance 706 for both secondary paths 251, 252. Therefore, the focusing is performed in the same way for the two detectors 280 of the channels 211, 212. In various examples, it may be worthwhile if the spectral ranges of light which are associated with the channels 211,212 or the secondary paths 251, 252 have at least overlapping or identical spectral ranges. It may thus be possible for such prisms which comprise secondary optical paths having identical spectral ranges to be assigned to a stack section. In this way, a dependence of the focal length on the light wavelength, that is to say the chromatic aberration, may be taken into account equally accurately with regard to the focusing for the channels 211, 212. It would then be possible, for example, for the optical path 253 of the prism 223 of the stack section 702 to be associated with a different spectral range than the secondary paths 251, 252.

In the example in FIGS. 8 and 9, the interface 705 is configured to enable the relative movement 770 parallel to the main optical path 250. In other examples, it would also be possible for additional or alternative degrees of freedom to be made possible for the relative movement 770. By way of example, the relative movement could alternatively or additionally also be implemented perpendicular to the main optical path 250 (that is to say, in the example in FIGS. 8 and 9, in a manner directed upward and downward and/or directed into the plane of the drawing and out of the plane of the drawing). By way of example, image stabilization may be made possible by a relative movement 770 perpendicular to the main optical path 250.

In the examples in FIGS. 8 and 9, the stack structure 201 comprises the two stack sections 701, 702. In other examples, it would also be possible for the stack structure 201 to comprise a larger number of stack sections and/or more than one interface between stack sections. One such example is illustrated in FIG. 10.

Figure 10:
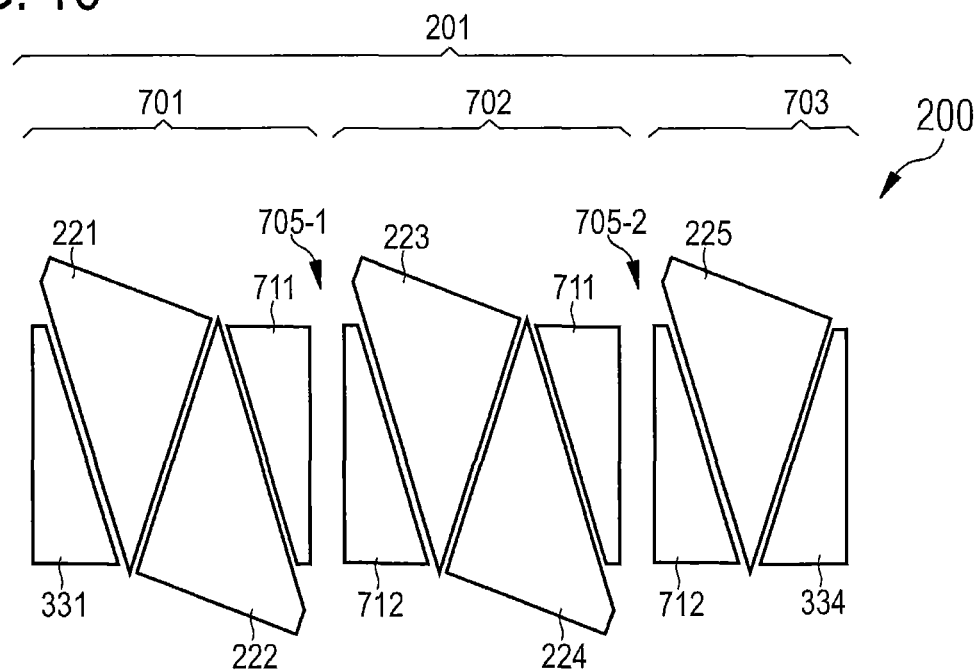
FIG. 10 illustrates a multi-way prism in accordance with various embodiments which comprises two interfaces and three stack sections.

FIG. 10 illustrates aspects with regard to a multi-way prism 200 comprising more than two, namely three, stack sections 701-703. In particular, the multi-way prism 200 of the example in FIG. 10 comprises three stack sections 701-703, which are respectively separated from one another by two interfaces 705-1, 705-2. In this case, the stack section 701 comprises the prisms 221, 222, which are rigidly coupled to one another; the stack section 702 comprises the prisms 223, 224, which are rigidly coupled to one another, and the stack section 703 comprises the prism 225.

FIG. 10 is a schematic, simplified view of the multi-way prism 200. In the example in FIG. 10, all the prisms 221-225 are shaped identically, i.e. have identical side lengths and prism angles. To that end, the multi-way prism 200 in FIG. 10 may comprise e.g. further optical elements, for instance the wedge 331 etc. In general, it is possible for the multi-way prism 200 in accordance with FIG. 10 to implement further techniques that have been described above in relation to the examples in FIGS. 2-5 and 8-9.

In various examples, a variety of techniques may be used for driving the relative movement 770. In one simple example, a manual drive of the relative movement 770 may be effected, for example.

FIG. 11 illustrates aspects with regard to driving the relative movement 770 by means of two motors 801, 802. It is evident from FIG. 11 that a respective motor 801, 802 is assigned to an individual interface 705-1, 705-2. What may be achieved in this way is that the relative positioning effected for the stack section 701 in relation to the stack section 702 is different than the relative positioning effected for the stack section 702 in relation to the stack section 703. At the same time, however, a larger structural space may be required for keeping available the two motors 801, 802.

In further examples, it would also be possible e.g. for a dedicated motor to be assigned to each stack section 701-703.

FIG. 12 illustrates aspects with regard to driving the relative movement 770 by means of a single motor 801. It is evident from FIG. 12 that the motor 801 is assigned to both interfaces 705-1, 705-2. A particularly efficient implementation in respect of structural space may be achieved as a result.

Such motors 801, 802, such as have been explained above with reference to FIGS. 11 and 12, may be configured to cause the relative movement 770 parallel to the main path 250 and/or perpendicular to the main path 250.

Figure 13:
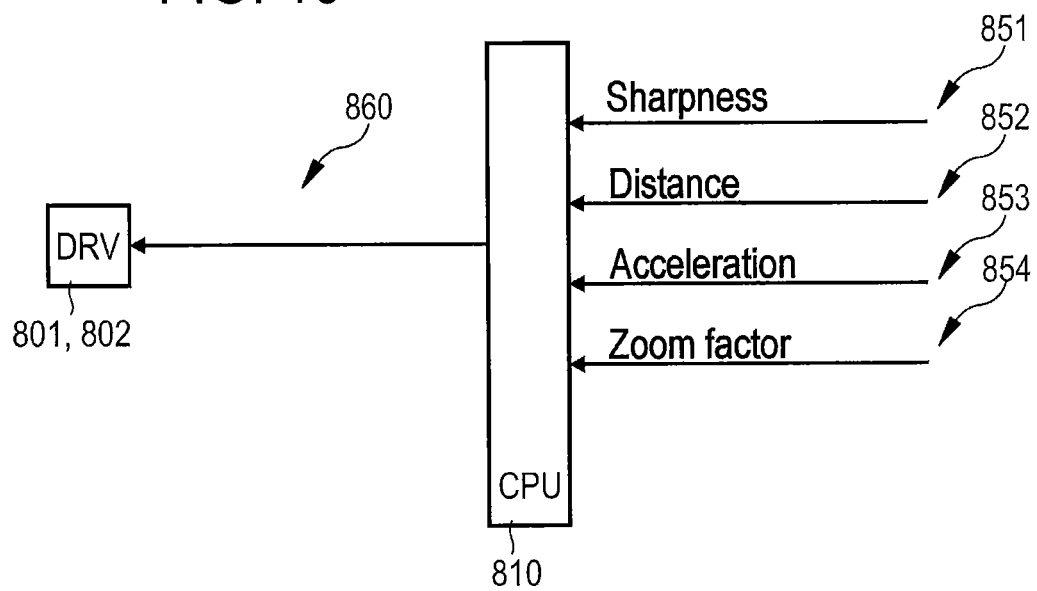
FIG. 13 schematically illustrates a computing unit for controlling motors for driving a relative movement between different stack sections of a multi-way prism.

FIG. 13 illustrates aspects with regard to controlling one or a plurality of motors 801, 802 on the basis of a control signal 860 that is output to said one or said plurality of motors 801, 802. The control signal 860 is generated by a computing unit 810, for example a processor. To that end, the processor 810 receives one or a plurality of control signals 851-854. For example, the control signal 851 indicates an edge sharpness present in an image detected by a detector 280. Typically, the edge sharpness may be used to carry out focusing in relation to the corresponding sensor surface 281 of the detector 280. Alternatively or additionally it would also be possible to take account of the control signal 852; said control signal 852 indicates a distance to an object that is imaged by a detector 280. For example, the control signal 852 could be obtained by means of a time-of-flight measurement method. The control signal 854 indicates a zoom factor of the lens 601. On the basis of one or a plurality of the control signals 851, 852, 854, focusing of the image plane defined by the beam path 110 onto the sensor surface 281 of the relevant detectors 280 may be carried out by suitable driving of the at least one motor 801, 802 by the computing unit 810.

Alternatively or additionally it would also be possible to use the control signal 853. The control signal 853 is indicative of an acceleration of the multi-way prism 200. An application of the movement stabilization may thereby be carried out, for example.

FIG. 14 illustrates aspects with regard to a multi-way prism 200 comprising a stack structure 201 comprising two stack sections 701, 702. The two stack sections 701, 702 are movable relative to one another along an interface 705. In this case, the relative movement 770 is oriented perpendicular to the main optical path 250.

In the example in FIG. 14, the stack section 702 was moved perpendicular to the main path 750 by the distance 706 relative to the stack section 701. Therefore, the secondary path 253 moves away from the center of the sensitive surface 281 of the detector 280 of the channel 213 (cf. FIGS. 8 and 13). The same correspondingly applies to the detectors 280 (not illustrated in FIG. 14 for reasons of clarity) of the channels 214, 215.

By means of such a relative movement 770 perpendicular to the main path 250, as discussed with reference to FIG. 14, image stabilization may thus be carried out. To that end, it may be possible to drive one or a plurality of corresponding motors 801, 802 depending on the control signal 853 that is indicative of the acceleration of the multi-way prism 200.

To summarize, a description has been given above of techniques based on the sequential arrangement of at least three prisms in a stack structure. A corresponding optical arrangement provides a multi-way prism. In various examples, the stack structure comprise five or more prisms.

By means of such techniques, it is possible to carry out compact splitting or combining of optical information in three, four, five or more channels. The techniques described herein make it possible to focus image planes of a lens onto sensor surfaces of detectors of the different channels in a coupled manner. In this regard, by means of the techniques described herein, it is possible to split the main optical path into different secondary paths. The position of an image plane lying at the output of the respective secondary path may vary for example depending on the lens used and the state thereof, for example the zoom position thereof. By means of the techniques described herein, it is possible to alter the light path for the different secondary paths in order to achieve focusing.

In various techniques, a positioning mechanism associated with the respective detector may be used for this purpose. The positioning mechanism may vary for example a distance between the respective detector and an outer surface of a prism assigned to the respective secondary path. Particularly accurate and channel-specific focusing may be carried out by means of such techniques. On the other hand, the required structural space for the positioning mechanism may be comparatively large, such that the size of the detectors used has to be reduced. This may lead to an increased complexity of the detectors used. By way of example, the cabling used for the detectors may be integrated in a comparatively complex manner. It may happen that corresponding cooling of the detectors is necessary, for example in the case of infrared applications; this may further reduce the required structural space, such that the positioning mechanism may be implemented only by means of complex geometries. Moreover, in the case of such techniques, inaccuracies may occur with regard to the positioning of the sensor surface of the detectors used in relation to the respective secondary paths. By way of example, a displacement and/or an offset of the sensor surfaces in relation to the secondary paths or the corresponding prisms may occur, which may cause an offset of the image plane in relation to the sensor surface.

In the case of further techniques, to that end it is possible to use an interface between first and second stack sections in a stack structure having at least three prisms. The interface may enable a relative movement of the first and second stack sections relative to one another. It is thereby possible to once again vary the light path in relation to the secondary paths assigned to the different prisms. Therefore, arranging a positioning mechanism in the region of the detectors is dispensable in such an example; rather, the positioning may be carried out by means of a suitable motor arranged elsewhere in relation to the stack structure. The region near the outer surfaces of the prisms of the stack structure, said region being critical in respect of structural space, therefore need not have a positioning mechanism.

In various examples, the optical arrangement also comprises a wedge arranged in front of an outer prism of the stack structure. This makes it possible to obtain a particularly simple construction of the stack structure. For example, it may be possible for the prism angles of the different prisms to be chosen to be identical. Furthermore, the wedge may make it possible for the angles of incidence at the different second surfaces of the prisms to be dimensioned to be comparatively small, such that a comparatively high transmission may be achieved. At the same time the wedge may make it possible for the angles of incidence at the first surfaces of the prisms to be dimensioned to be comparatively small, such that here, too, a comparatively high transmission may be achieved in the main path and in parallel, however, the total internal reflection of the light of the secondary paths is reliably achieved as well. Furthermore, the wedge may make it possible for the distances between adjacent channels to become larger, such that detectors and/or light sources with larger housings may be used.

The techniques described herein may be used in a wide variety of fields of application. In particular, the multi-way prisms described herein may be used for lens connections that fulfil the B4 standard. This is the case since the multi-way prisms described herein require a comparatively small structural space and furthermore enable a short light path through glass (glass path).

It goes without saying that the features of the embodiments and aspects of the invention described above may be combined with one another. In particular, the features may be used not only in the combinations described but also in other combinations or on their own without departing from the scope of the invention.

By way of example, a description has been given above of various implementations with regard to splitting optical information or optical paths for a detection device. Corresponding techniques may also be directly applied to implementation with regard to combining optical information or optical paths for a projection device.

By way of example, a description has been given above of various applications with regard to a lens connection. However, it is also possible for optical arrangements which implement a multi-way prism as described herein to be used in other applications. A further exemplary field of application is e.g. a multicolored light source for fluorescence microscopy. In this case, it is possible to provide e.g. ten or more channels, e.g. more than twelve channels, with corresponding LEDs as light sources. The LEDs may be combined e.g. with converging lenses. By combining the corresponding secondary optical paths, it is then possible to implement the output along a single main optical path. Correlated focusing and/or image stabilization may also be implemented with regard to light sources by means of the techniques described herein. A further exemplary application would be that of splitting the main path into a plurality of secondary paths that are respectively assigned to an eyepiece.

By way of example, various implementations have been illustrated above with regard to Bauernfeind-like prisms in which total internal reflection occurs at a second surface of the prism and partial reflection occurs at a first surface of the prism. However, it would also be possible for corresponding prisms to be implemented by differently shaped geometric bodies in which, for example, no total internal reflection occurs at the first surface.

An explanation has been given above of optical arrangements in which the stack structure comprises prisms which enable the main path to be split into a plurality of secondary paths. Corresponding techniques that have been described above with regard to the relative movement of different stack sections of the stack structure with respect to one another may also be implemented by mirrors in other examples. To that end, the different mirrors may have a partly reflective surface that connects the respectively assigned secondary optical path to the main optical path. The relative movement may then be implemented via a corresponding interface between adjacent mirrors of the stack structure. In this context, it would be possible, for example, for the different mirrors each to comprise a filter, as described above, which carries out filtering of the reflected light with regard to the spectral range or other optical properties, such as, for example, polarization, etc.

The invention claimed is:

1. An optical arrangement, comprising:
   a stack structure comprising at least three prisms, each of the at least three prisms having a first surface and an opposite second surface,
   a main optical path, which extends through the stack structure,
   for each of the at least three prisms of the stack structure, a secondary optical path, which extends through the corresponding prism of the at least three prisms and which is connected to the main path by partial reflection of light at the second surface of the corresponding prism,
   at least one interface associated with corresponding ones of the at least three prisms,
   wherein each of the at least one interface is arranged between a corresponding first stack section of the stack structure and a corresponding second stack section of the stack structure, and
   wherein each of the at least one interface is configured to enable relative movement of the corresponding first stack section and of the corresponding second stack section with respect to one another.

2. The optical arrangement of claim 1, further comprising:
at least one motor configured to cause the relative movement parallel to the main path.

3. The optical arrangement of claim 2, wherein each of the at least three prisms of the stack structure comprises:
at least one detector; and
a computing unit which is connected to the at least one motor and which is configured to control, based on a received control signal, the at least one motor for focusing an image plane defined by a beam path of light along the main path and the secondary paths onto sensor surfaces of the detectors.

4. The optical arrangement of claim 1, further comprising:
at least one motor configured to cause the relative movement perpendicular to the main path.

5. The optical arrangement of claim 4, further comprising:
a computing unit, which is connected to the motor and which is configured to control the motor based on a received control signal indicating an acceleration of the optical arrangement.

6. The optical arrangement of claim 1,
wherein the at least one interface is configured to enable the relative movement perpendicular and/or parallel to the main path.

7. The optical arrangement of claim 1, wherein for each of the at least three prisms of the stack structure the optical arrangement further comprises:
at least one detector that is rigidly coupled to the corresponding prism.

8. The optical arrangement of claim 1,
wherein the secondary optical paths of the at least three prisms of the stack structure which belong to a same stack section of the stack structure are associated with at least overlapping spectral ranges.

9. The optical arrangement of claim 1,
wherein the secondary optical paths of the at least three prisms of the stack structure which belong to different stack sections of the stack structure are associated with different spectral ranges.

10. The optical arrangement of claim 1,
wherein the first stack section and/or the second stack section of at least one of the at least one interface comprises at least two prisms which are rigidly coupled to one another and whose secondary optical paths, in the region of an outer surface of the respective prism, form an angle with one another that is greater than 90°.

11. The optical arrangement of claim 1,
wherein the first stack section and/or the second stack section of at least one of the at least one interface do not comprise more than one prism.

12. The optical arrangement of claim 1,
wherein the at least one interface is configured to enable the relative movement with a travel of not less than 500 µm.

13. The optical arrangement of claim 1,
wherein each of the at least one interface comprises a first wedge having a first surface and a second surface and a second wedge having a first surface and a second surface,
wherein the first surface of the first wedge of the interface is parallel to the second surface of an adjacent prism of the corresponding first stack section,
wherein the second surface of the first wedge of the interface is parallel to the first surface of the second wedge of the interface,
wherein the second surface of the second wedge of the interface is parallel to the first surface of an adjacent prism of the corresponding second stack section, and
wherein an air gap is between the second surface of the first wedge of the interface and the first surface of the second wedge of the interface.

14. The optical arrangement of claim 1,
wherein the secondary optical path of each of the at least three prisms experiences total internal reflection at the first surface of the respective prism of the at least three prisms.

15. The optical arrangement of claim 1, further comprising:
a wedge having a first surface and a second surface,
wherein the wedge is arranged in the main path adjacent to a first surface of an outer prism of the stack structure,
wherein the second surface of the wedge is arranged parallel to the first surface of the outer prism, and
wherein respective prism angles between the first surface and the second surface of ones of the at least three prisms is identical for the ones of the at least three prisms of the stack structure.

16. The optical arrangement of claim 15,
wherein the at least three prisms of the stack structure are shaped identically.

17. The optical arrangement of claim 1,
wherein the main path and the secondary paths within the stack structure lie in one plane.

18. The optical arrangement of claim 1,
wherein the optical arrangement is configured to focus an image plane of a lens onto a sensor surface of a detector of the optical arrangement.

19. The optical arrangement of claim 1
wherein the optical arrangement is configured to provide image stabilization of an image plane of a lens on a sensor surface of a detector of the optical arrangement.

20. A lens connection for a lens of a camera,
wherein the lens connection comprises the optical arrangement of claim 1.

21. A lens connection for a lens of a camera, comprising:
a stack structure comprising at least three prisms, each of the at least three prisms having a first surface and an opposite second surface;
a main optical path, which extends through the stack structure;
for each of the at least three prisms of the stack structure, a secondary optical path, which extends through the corresponding prism and which is connected to the main path by partial reflection of light at the second surface of the corresponding prism of the at least three prisms,
at least one interface,
wherein each of the at least one interface is between a corresponding first stack section of the stack structure and a corresponding second stack section of the stack structure, and
wherein each of the at least one interface is configured to enable relative movement of the corresponding first stack section and of the corresponding second stack section with respect to one another.

22. The lens connection as claimed in claim 21,
wherein the at least one interface is configured to enable the relative movement parallel to a beam path of light between the lens and an image plane of the lens.

* * * * *

UNITED STATES PATENT AND TRADEMARK OFFICE
CERTIFICATE OF CORRECTION

PATENT NO. : 10,877,286 B2
APPLICATION NO. : 16/091686
DATED : December 29, 2020
INVENTOR(S) : Sondermann et al.

Page 1 of 1

It is certified that error appears in the above-identified patent and that said Letters Patent is hereby corrected as shown below:

On the Title Page

(30) Foreign Application Priority Data:
Please correct "10 2016 106 462" to read -- 10 2016 106 462.9 --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*